US012684492B2

(12) United States Patent
Yuan et al.

(10) Patent No.: US 12,684,492 B2
(45) Date of Patent: Jul. 14, 2026

(54) DEFAULT PATH LOSS REFERENCE SIGNAL IN UNIFIED TRANSMISSION CONFIGURATION INDICATION FRAMEWORK

(71) Applicant: QUALCOMM Incorporated, San Diego, CA (US)

(72) Inventors: Fang Yuan, Beijing (CN); Yan Zhou, San Diego, CA (US); Mostafa Khoshnevisan, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 186 days.

(21) Appl. No.: 18/253,448

(22) PCT Filed: Jan. 5, 2021

(86) PCT No.: PCT/CN2021/070220
§ 371 (c)(1),
(2) Date: May 18, 2023

(87) PCT Pub. No.: WO2022/147635
PCT Pub. Date: Jul. 14, 2022

(65) Prior Publication Data
US 2023/0422180 A1     Dec. 28, 2023

(51) Int. Cl.
H04B 7/00          (2006.01)
H04L 5/00          (2006.01)
(Continued)

(52) U.S. Cl.
CPC ......... H04W 52/146 (2013.01); H04L 5/0051 (2013.01); H04L 5/0053 (2013.01); H04W 52/242 (2013.01)

(58) Field of Classification Search
CPC ............. H04W 52/146; H04W 52/242; H04W 52/0206; H04W 52/0209; H04W 52/04; H04W 52/143; H04W 52/248
See application file for complete search history.

(56) References Cited

U.S. PATENT DOCUMENTS

2021/0050666 A1*  2/2021  Cirik ..................... H04W 76/38
2022/0394499 A1*  12/2022  Matsumura ........... H04L 5/0051

FOREIGN PATENT DOCUMENTS

CN          110972251 A      4/2020

OTHER PUBLICATIONS

Huawei, et al., "Remaining Issues on R16 MIMO," 3GPP TSG RAN WG1 Meeting #100-e, R1-2001103, Feb. 24-Mar. 6, 2020, (Mar. 6, 2020), sections 1-3, 4 pages.
(Continued)

*Primary Examiner* — Tuan Pham
(74) *Attorney, Agent, or Firm* — Harrity & Harrity LLP

(57)          ABSTRACT

In a wireless network, a user equipment (UE) may be unable to determine a default path loss reference signal associated with an uplink transmission if the uplink transmission is transmitted using abeam associated with a transmission configuration indication (TCI) state and/or the uplink transmission and/or a physical downlink control channel (PDCCH) scheduling the uplink transmission is associated with a repetition configuration. In such cases, depending on a type associated with the uplink transmission, the UE may determine the default path loss reference signal based on the repetition configuration associated with the PDCCH and/or a TCI state for an uplink control channel or uplink reference signal. Accordingly, the UE may perform an uplink power control operation for the uplink transmission using the default path loss reference signal determined based on the repetition configuration associated with the PDCCH and/or
(Continued)

the TCI state for the uplink control channel or uplink reference signal.

30 Claims, 12 Drawing Sheets

(51) Int. Cl.
    *H04W 52/14*      (2009.01)
    *H04W 52/24*      (2009.01)

(56)          References Cited

OTHER PUBLICATIONS

International Search Report and Written Opinion—PCT/CN2021/070220—ISA/EPO—Sep. 28, 2021.

Nokia, et al., "Maintenance of Rel-16 Beam Management," 3GPP TSG RAN WG1 #100, R1-2000989, e-meeting, Feb. 18-Mar. 6, 2020, (Mar. 6, 2020), sections 1-3, 5 pages.

OPPO: "Remaining Issues on Multi-Beam Operation Enhancement," 3GPP TSG RAN WG1 #100, R1-2000458, e-Meeting, Feb. 24-Mar. 6, 2020, (Mar. 6, 2020), sections 1-3, 8 pages.

Qualcomm Incorporated: "Remaining Issue on Multi-Beam Operation," 3GPP Draft, 3GPP TSG RAN WG1 Meeting #103-e, R1-2008611, 3rd Generation Partnership Project (3GPP), Mobile Competence Centre, 650, Route Des Lucioles, F-06921, Sophia-Antipolis Cedex, France, vol. RAN WG1, No. e-meeting, Oct. 26, 2020-Nov. 13, 2020, Oct. 17, 2020 (Oct. 17, 2020), XP051940237, 5 pages, section 4, the whole document.

Qualcomm Incorporated: "Remaining Issue on Multi-beam Operation", 3GPP TSG RAN WG1 Meeting #103-e, R1-2008611, 3rd Generation Partnership Project, Mobile Competence Centre, 650, Route Des Lucioles, F-06921 Sophia-antipolis Cedex, France, vol. RAN WG1, No. e-Meeting, Oct. 26, 2010-Nov. 13, 2020, Oct. 17, 2020, XP051940237, 5 Pages, The Whole Document.

Supplementary European Search Report—EP21916693—Search Authority—The Hague—Aug. 29, 2024.

Moderator (Samsung): "Moderator Summary for Multi-beam Enhancement: Proposal Categorization", 3GPP TSG RAN WG1 #102-e, R1-2006985, e-Meeting, Aug. 17-28, 2020, Aug. 26, 2020, 27 Pages.

Nokia, et al., "Maintenance of Rel-16 Beam Management", 3GPP TSG RAN WG1 #100, R1-2000989, 3rd Generation Partnership Project, Mobile Competence Centre, 650, Route Des Lucioles, F-06921 Sophia-antipolis Cedex, France, vol. Ran WG1, No. e-Meeting, Feb. 6, 2020-Mar. 18, 2020, Feb. 14, 2020, 5 Pages, XP051853115.

* cited by examiner

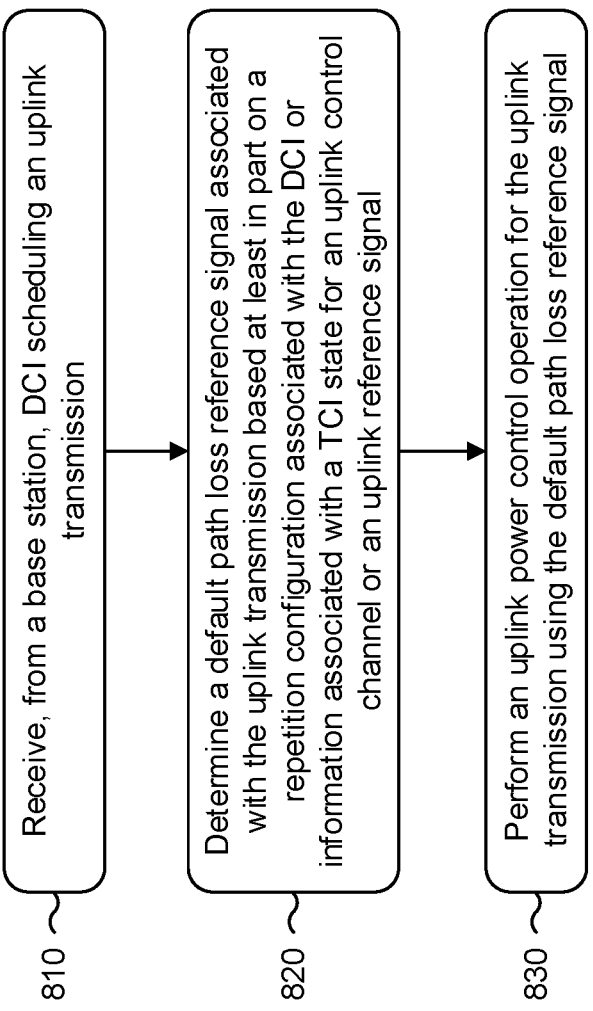

Receive, from a base station, DCI scheduling an uplink transmission

810

Determine a default path loss reference signal associated with the uplink transmission based at least in part on a repetition configuration associated with the DCI or information associated with a TCI state for an uplink control channel or an uplink reference signal

820

Perform an uplink power control operation for the uplink transmission using the default path loss reference signal

DEFAULT PATH LOSS REFERENCE SIGNAL IN UNIFIED TRANSMISSION CONFIGURATION INDICATION FRAMEWORK

CROSS-REFERENCE TO RELATED APPLICATION

This application is a 371 national stage of Patent Cooperation Treaty (PCT) Application No. PCT/CN2021/070220 filed on Jan. 5, 2021, entitled "DEFAULT PATH LOSS REFERENCE SIGNAL IN UNIFIED TRANSMISSION CONFIGURATION INDICATION FRAMEWORK," which is hereby expressly incorporated by reference herein.

FIELD OF THE DISCLOSURE

Aspects of the present disclosure generally relate to wireless communication and to techniques and apparatuses for determining a default path loss reference signal in a unified transmission configuration indication (TCI) framework.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, or the like.

The above multiple access technologies have been adopted in various telecommunication standards to provide a common protocol that enables different wireless communication devices to communicate on a municipal, national, regional, and even global level. 5G, which may also be referred to as New Radio (NR), is a set of enhancements to the LTE mobile standard promulgated by the 3GPP. 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

SUMMARY

In a wireless network, a user equipment (UE) may receive a path loss reference signal from a base station in connection with an uplink power control operation associated with an uplink transmission. For example, the UE may measure the path loss reference signal in order to determine a path loss over a channel between the UE and the base station, and the UE may adjust a transmit power used for an uplink transmission to the base station based at least in part on the determined path loss. In some cases, the base station may not provide the UE with configuration information related to the path loss reference signal that the UE is to measure to determine the adjustment to the transmit power that the UE employs for the uplink transmission. In such cases, the UE generally applies one or more rules to determine a default path loss reference signal. For example, the base station may transmit, and the UE may receive, downlink control information (DCI) scheduling the uplink transmission, and the UE may determine the default path loss reference signal based on one or more parameters of a control resource set (CORESET) that is associated with a single transmission configuration indication (TCI) state.

Accordingly, in some cases, a UE may be unable to determine the default path loss reference signal in cases where a physical downlink control channel (PDCCH) is associated with a repetition configuration to improve reliability and/or robustness. For example, one PDCCH repetition technique may be to transmit one DCI message in two search spaces that are associated with two CORESETs. In another PDCCH repetition technique, a DCI message may be transmitted in one CORESET associated with two TCI states (e.g., using two beams that point in different directions). However, the PDCCH repetition may create ambiguity in cases where the UE must determine the default path loss reference signal according to rules that are based on a single CORESET and/or a CORESET that has a single TCI state. Additionally, or alternatively, in a wireless network that supports beamformed uplink communication in a unified TCI framework (e.g., using a joint downlink and uplink TCI state and/or separate downlink and uplink TCI states), the UE may be unable to apply rules that are based only on a downlink TCI state in order to determine the default path loss reference signal. Furthermore, in cases where the uplink transmission is a physical uplink shared channel (PUSCH) and/or a physical uplink control channel (PUCCH) transmitted with repetitions in a beam sweep, the UE may be unable to determine the default path loss reference signal based on default rules that do not take an uplink beam sweep into consideration (e.g., default rules to determine a single path loss reference signal may be insufficient because different path loss reference signals may be needed to measure the path loss in different directions).

Some aspects described herein relate to techniques and apparatuses to determine a default path loss reference signal for an uplink transmission in cases where a PDCCH scheduling the uplink transmission is associated with a repetition configuration with multiple CORESETs and/or a CORESET associated with multiple TCI states, in cases where the uplink transmission is associated with an uplink TCI state or a joint downlink and uplink TCI state, and/or in cases where the uplink transmission is associated with a repetition configuration including an uplink beam sweep. For example, the UE may apply different rules to determine the default path loss reference signal depending on whether the uplink transmission is a fallback PUSCH associated with PUCCH resources, a fallback PUSCH with PUCCH resources unavailable, a non-fallback PUSCH, a PUCCH, or a sounding reference signal (SRS). For example, as described herein, the UE may determine the default path loss reference signal based at least in part on a repetition configuration associated with the DCI scheduling the uplink transmission or information associated with a TCI state for an uplink control channel (e.g., a PUCCH) or an uplink reference signal (e.g., an SRS). Furthermore, as described herein, the UE may determine a mapping between different default path loss reference signals and different uplink beams in cases where the uplink transmission is associated with a repetition configuration.

In some aspects, a method of wireless communication performed by a UE includes receiving, from a base station, DCI scheduling an uplink transmission; determining a default path loss reference signal associated with the uplink transmission based at least in part on a repetition configuration associated with the DCI or information associated with a TCI state for an uplink control channel or an uplink reference signal; and performing an uplink power control operation for the uplink transmission using the default path loss reference signal.

In some aspects, a UE for wireless communication includes a memory and one or more processors operatively coupled to the memory, the memory and the one or more processors configured to: receive, from a base station, DCI scheduling an uplink transmission; determine a default path loss reference signal associated with the uplink transmission based at least in part on a repetition configuration associated with the DCI or information associated with a TCI state for an uplink control channel or an uplink reference signal; and perform an uplink power control operation for the uplink transmission using the default path loss reference signal.

In some aspects, a non-transitory computer-readable medium storing a set of instructions for wireless communication includes one or more instructions that, when executed by one or more processors of a UE, cause the UE to: receive, from a base station, DCI scheduling an uplink transmission; determine a default path loss reference signal associated with the uplink transmission based at least in part on a repetition configuration associated with the DCI or information associated with a transmission configuration indication state for an uplink control channel or an uplink reference signal; and perform an uplink power control operation for the uplink transmission using the default path loss reference signal.

In some aspects, an apparatus for wireless communication includes means for receiving, from a base station, DCI scheduling an uplink transmission; means for determining a default path loss reference signal associated with the uplink transmission based at least in part on a repetition configuration associated with the DCI or information associated with a TCI state for an uplink control channel or an uplink reference signal; and means for performing an uplink power control operation for the uplink transmission using the default path loss reference signal.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

FIG. 8 is a flowchart of an example method of wireless communication.

DETAILED DESCRIPTION

Figure 1:
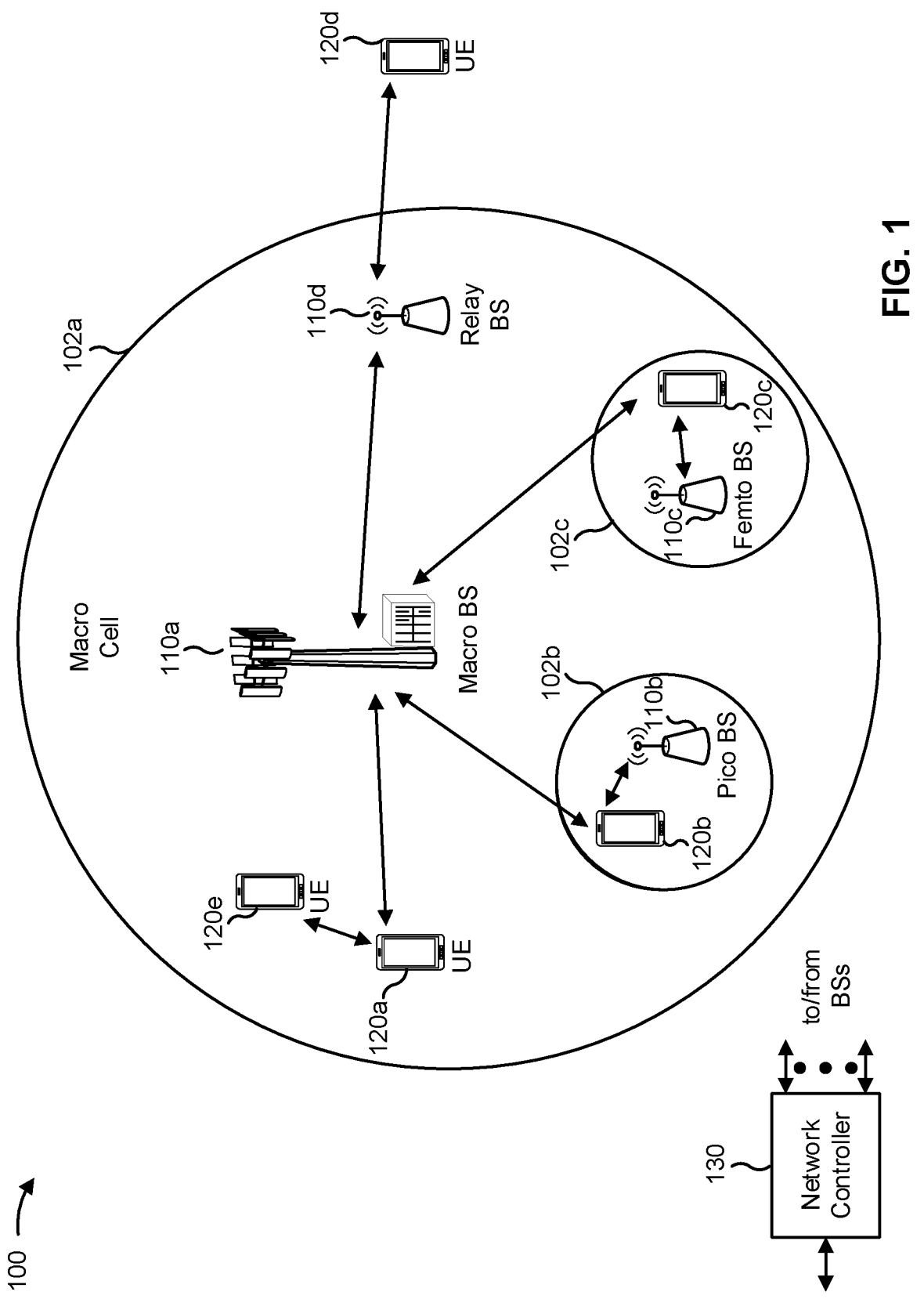
FIG. 1 is diagram illustrating an example of a wireless network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EE-PROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating a wireless network 100 in which aspects of the present disclosure may be practiced. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as a 5G BS, a Node B, a gNB, a 5G NB, an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, or the like.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, a UE 120 may receive a path loss reference signal from a base station 110 in connection with an uplink power control operation associated with an uplink transmission. For example, the UE 120 may measure the path loss reference signal in order to determine a path loss over a channel between the UE 120 and the base station 110, and the UE 120 may adjust a transmit power used for an uplink transmission to the base station 110 based at least in part on the determined path loss. In some cases, the base station 110 may not provide the UE 120 with configuration information related to the path loss reference signal that the UE 120 is to measure to determine the adjustment to the transmit power that the UE 120 employs for the uplink transmission. In such cases, the UE 120 generally applies one or more rules to determine a default path loss reference signal. For example, the base station 110 may transmit, and the UE 120 may receive, DCI scheduling the uplink transmission, and the UE 120 may determine the default path loss reference signal based on one or more parameters of a control resource set (CORESET) associated with a single transmission configuration indication (TCI) state.

Accordingly, in some cases, the UE 120 may be unable to determine the default path loss reference signal in cases where a physical downlink control channel (PDCCH) is associated with a repetition configuration to improve reliability and/or robustness. For example, one PDCCH repetition technique may be to transmit one DCI message in two search spaces that are associated with two CORESETs. In another PDCCH repetition technique, a DCI message may be transmitted in one CORESET associated with two TCI states (e.g., using two beams that point in different directions). However, the PDCCH repetition may create ambiguity in cases where the UE 120 must determine the default path loss reference signal according to rules that are based on a single CORESET and/or a CORESET that has a single TCI state. Additionally, or alternatively, in cases where the wireless network 100 supports beamformed uplink communication in a unified TCI framework (e.g., using a joint downlink and uplink TCI state and/or separate downlink and uplink TCI states), the UE 120 may be unable to apply rules that are based only on a downlink TCI state to determine the default path loss reference signal. Furthermore, in cases where the uplink transmission is a physical uplink shared channel (PUSCH) and/or a physical uplink control channel (PUCCH) transmitted with repetitions in a beam sweep, the UE 120 may be unable to determine the default path loss reference signal based on default rules that do not take an uplink beam sweep into consideration (e.g., default rules to determine a single path loss reference signal may be insufficient because different path loss reference signals may be needed to measure the path loss in different directions).

Accordingly, in some aspects, a UE 120 may be configured to determine a default path loss reference signal for an uplink transmission in cases where a PDCCH scheduling the uplink transmission is associated with a repetition configuration with multiple CORESETs and/or a CORESET associated with multiple TCI states, in cases where the uplink transmission is associated with an uplink TCI state or a joint downlink and uplink TCI state, and/or in cases where the uplink transmission is associated with a repetition configuration including an uplink beam sweep. For example, the UE 120 may apply different rules to determine the default path loss reference signal depending on whether the uplink transmission is a fallback PUSCH associated with PUCCH resources, a fallback PUSCH with PUCCH resources unavailable, a non-fallback PUSCH, a PUCCH, or a sounding reference signal (SRS). For example, as described herein, the UE 120 may determine the default path loss reference signal based at least in part on a repetition configuration associated with the DCI scheduling the uplink transmission or information associated with a TCI state for an uplink control channel (e.g., a PUCCH) or an uplink reference signal (e.g., an SRS). Furthermore, as described herein, the UE 120 may determine a mapping between different default path loss reference signals and different uplink beams in cases where the uplink transmission is associated with a repetition configuration.

As indicated above, FIG. 1 is provided as an example. Other examples may differ from what is described with regard to FIG. 1.

Figure 2:
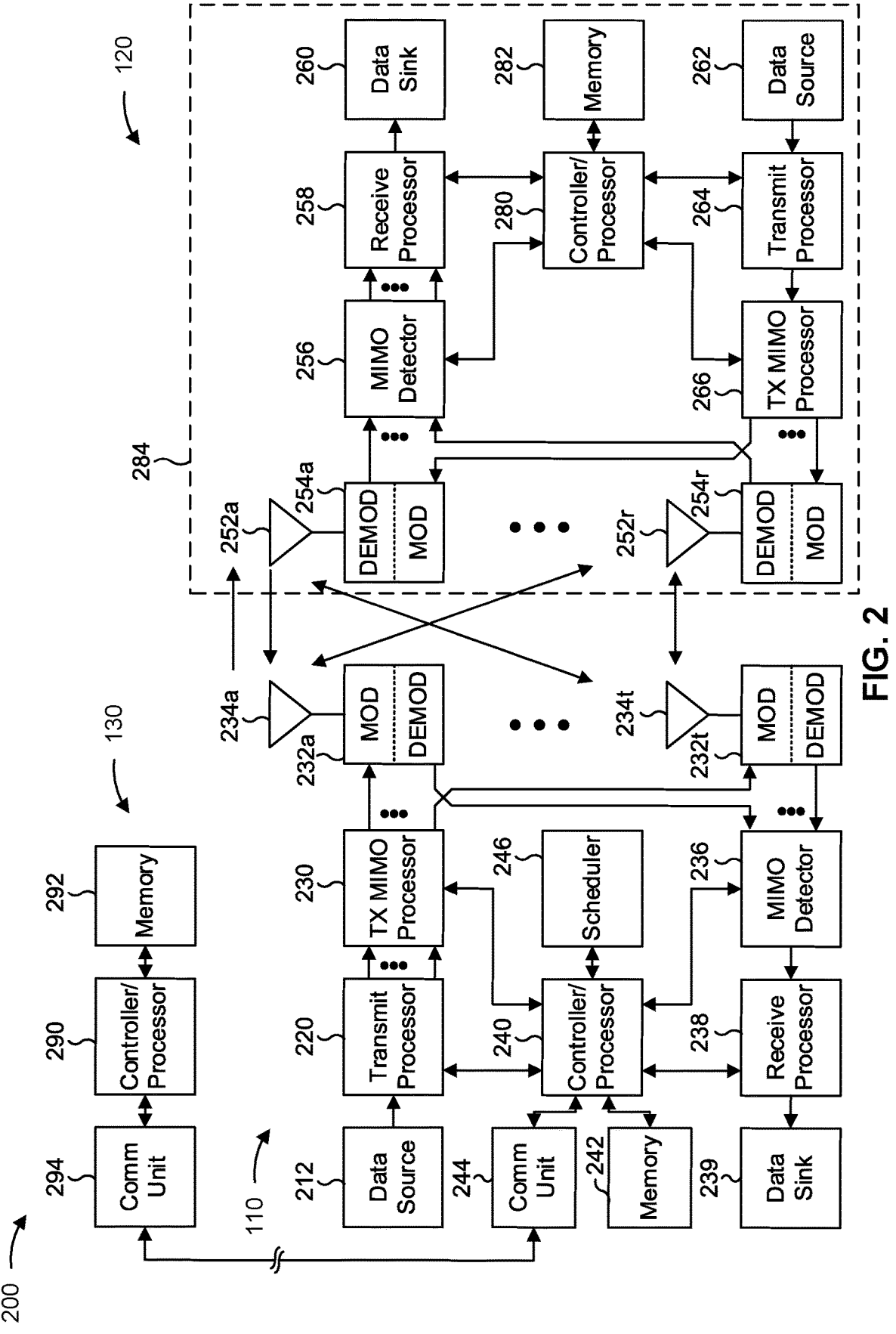
FIG. 2 is a diagram illustrating an example of a base station in communication with a UE in a wireless network.

FIG. 2 is a diagram illustrating an example 200 of a base station 110 in communication with a UE 120 in a wireless network 100. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, may select a modulation and coding scheme (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS), a phase tracking reference signal (PTRS), a demodulation reference signal (DMRS), and/or a path loss reference signal (PLRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein. A scheduler 246 may schedule UEs for data transmission on the downlink and/or uplink.

Controller/processor 240 of base station 110, controller/processor 280 of UE 120, and/or any other component(s) of FIG. 2 may perform one or more techniques associated with determining a default path loss reference signal in a unified transmission configuration indication (TCI) framework, as described in more detail elsewhere herein. For example, controller/processor 240 of base station 110, controller/processor 280 of UE 120, and/or any other component(s) of FIG. 2 may perform or direct operations of, for example, method 800 of FIG. 8 and/or other processes as described herein. Memories 242 and 282 may store data and program codes for BS 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, method 800 of FIG. 8 and/or other processes as described herein. In some aspects, executing instructions may include running the instructions, converting the instructions, compiling the instructions, and/or interpreting the instructions, among other examples.

In some aspects, the UE 120 includes means for receiving, from a base station, DCI scheduling an uplink transmission; means for determining a default path loss reference signal associated with the uplink transmission based at least in part on a repetition configuration associated with the DCI or information associated with a TCI state for an uplink control channel or an uplink reference signal; and/or means for performing an uplink power control operation for the uplink transmission using the default path loss reference signal. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

As indicated above, FIG. 2 is provided as an example. Other examples may differ from what is described with regard to FIG. 2.

Figure 3:
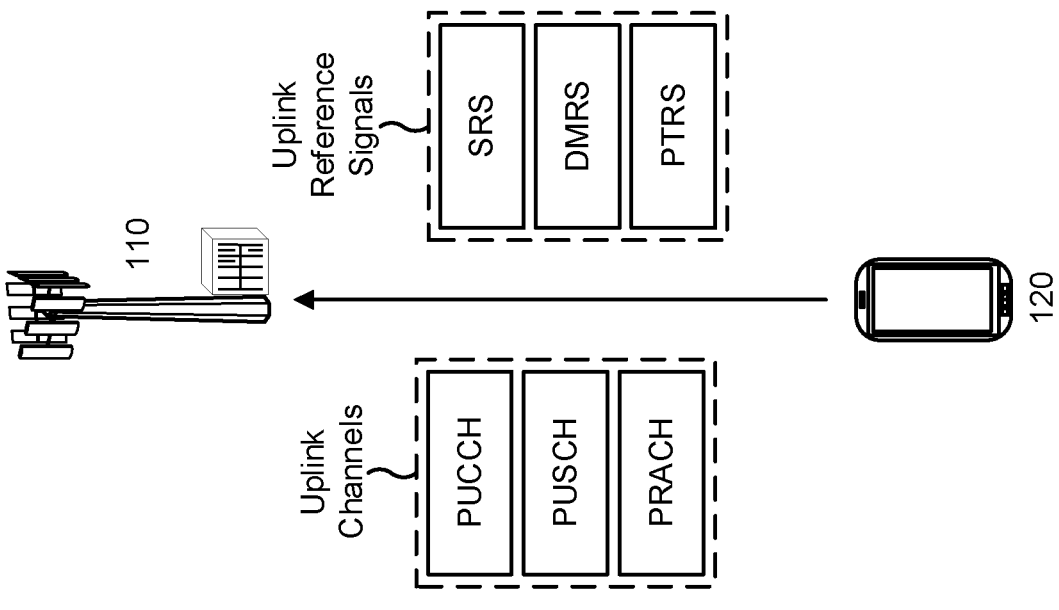
FIG. 3 is a diagram illustrating an example of physical channels and reference signals in a wireless network.

FIG. 3 is a diagram illustrating an example 300 of physical channels and reference signals in a wireless network. As shown in FIG. 3, downlink channels and downlink reference signals may carry information from a base station 110 to a UE 120, and uplink channels and uplink reference signals may carry information from a UE 120 to a base station 110.

As shown, a downlink channel may include a PDCCH that carries DCI, a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a demodulation reference signal (DMRS), a phase tracking reference signal (PTRS), or a path loss reference signal (PLRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The base station 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PLRS may carry information to enable the UE 120 to perform an uplink power control operation for an uplink transmission (e.g., an uplink channel or an uplink reference signal). For example, the base station 110 may transmit a PLRS using a certain power value, which may be indicated to or otherwise provided to the UE 120. The UE may measure the PLRS transmitted from the base station 110 to determine an RSRP measurement or other suitable measurement indicating a power at which the PLRS is received. Accordingly, the UE 120 may determine a path loss over a channel between the base station 110 and the UE 120 based on a difference between the power at which the PLRS is received and the power at which the base station 110 transmitted the PLRS. The UE may then adjust an uplink transmit power for an uplink transmission based on the path loss over the channel between the base station 110 and the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As indicated above, FIG. 3 is provided as an example. Other examples may differ from what is described with regard to FIG. 3.

Figure 4:
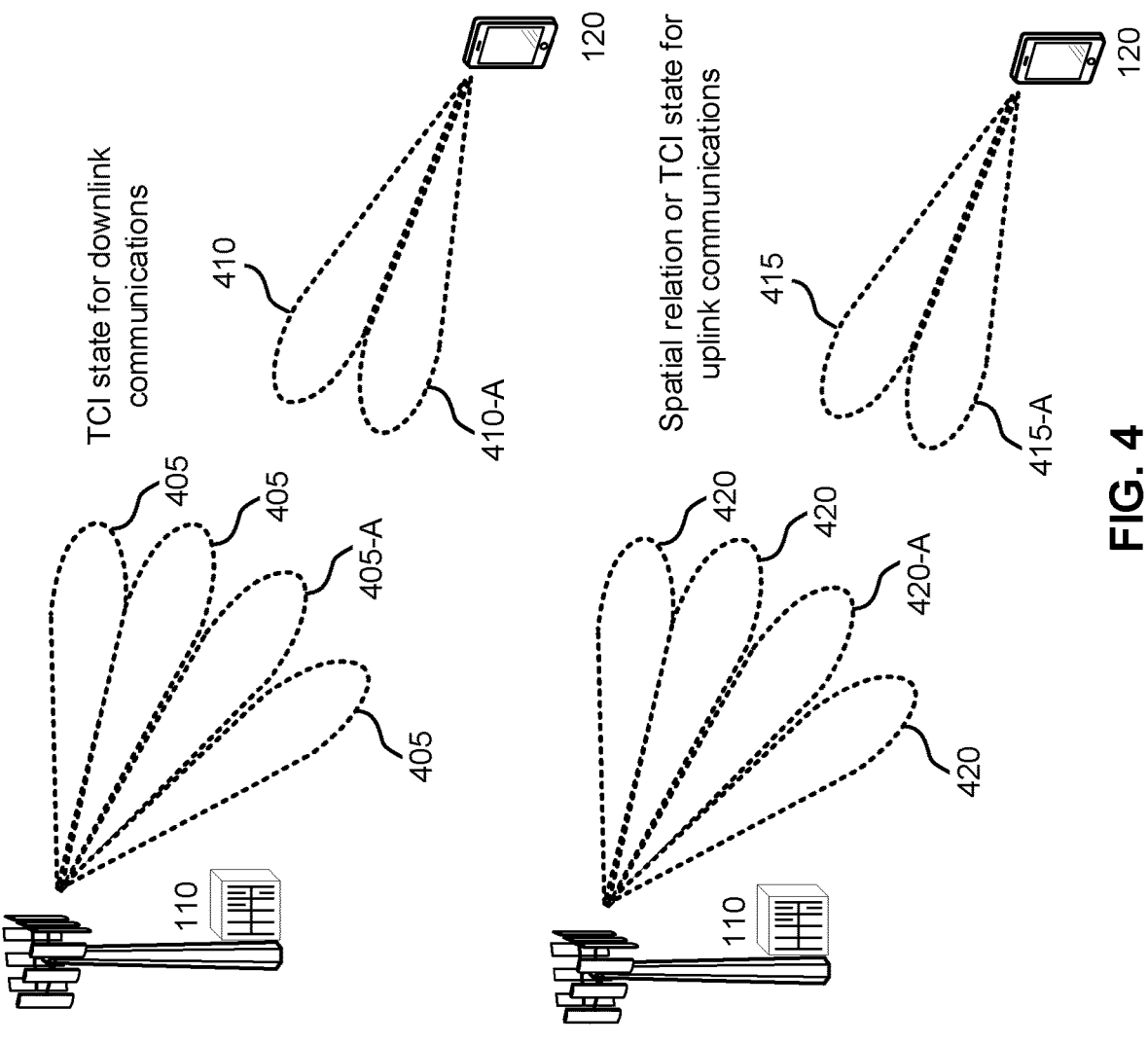
FIG. 4 is a diagram illustrating an example of using beams for communications between a base station and a UE.

FIG. 4 is a diagram illustrating an example 400 of using beams for communications between a base station and a UE. As shown in FIG. 4, a base station 110 and a UE 120 may use the beams to communicate with one another in a wireless network (e.g., wireless network 100).

The base station 110 may transmit to UEs 120 located within a coverage area of the base station 110. The base station 110 and the UE 120 may be configured for beamformed communications, where the base station 110 may transmit in the direction of the UE 120 using a directional BS transmit beam, and the UE 120 may receive the transmission using a directional UE receive beam. Each BS transmit beam may have an associated beam ID, beam direction, or beam symbols, among other examples. The base station 110 may transmit downlink communications via one or more BS transmit beams 405.

The UE 120 may attempt to receive downlink transmissions via one or more UE receive beams 410, which may be configured using different beamforming parameters at receive circuitry of the UE 120. The UE 120 may identify a particular BS transmit beam 405, shown as BS transmit beam 405-A, and a particular UE receive beam 410, shown as UE receive beam 410-A, that provide relatively favorable performance (for example, that have a best channel quality of the different measured combinations of BS transmit beams 405 and UE receive beams 410). In some examples, the UE 120 may transmit an indication of which BS transmit beam 405 is identified by the UE 120 as a preferred BS transmit beam, which the base station 110 may select for transmissions to the UE 120. The UE 120 may thus attain and maintain a beam pair link (BPL) with the base station 110 for downlink communications (for example, a combination of the BS transmit beam 405-A and the UE receive beam 410-A), which may be further refined and maintained in accordance with one or more established beam refinement procedures.

A downlink beam, such as a BS transmit beam 405 or a UE receive beam 410, may be associated with a TCI state. A TCI state may indicate a directionality or a characteristic of the downlink beam, such as one or more QCL properties of the downlink beam. A QCL property may include, for example, a Doppler shift, a Doppler spread, an average delay, a delay spread, or spatial receive parameters, among other examples. In some examples, each BS transmit beam 405 may be associated with an SSB, and the UE 120 may indicate a preferred BS transmit beam 405 by transmitting uplink transmissions in resources of the SSB that are associated with the preferred BS transmit beam 405. A particular SSB may have an associated TCI state (for example, for an antenna port or for beamforming). The base station 110 may, in some examples, indicate a downlink BS transmit beam 405 based at least in part on antenna port QCL properties that may be indicated by the TCI state. A TCI state may be associated with one downlink reference signal set (for example, an SSB and an aperiodic, periodic, or semi-persistent CSI-RS) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 410 at the UE 120. Thus, the UE 120 may select a corresponding UE receive beam 410 from a set of BPLs based at least in part on the base station 110 indicating a BS transmit beam 405 via a TCI indication.

The base station 110 may maintain a set of activated TCI states for downlink shared channel transmissions and a set of activated TCI states for downlink control channel transmissions. The set of activated TCI states for downlink shared channel transmissions may correspond to beams that the base station 110 uses for downlink transmission on a PDSCH. The set of activated TCI states for downlink control channel communications may correspond to beams that the base station 110 may use for downlink transmission on a PDCCH or in a CORESET. The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as a radio resource control (RRC) message.

Similarly, for uplink communications, the UE 120 may transmit in the direction of the base station 110 using a directional UE transmit beam, and the base station 110 may receive the transmission using a directional BS receive beam. Each UE transmit beam may have an associated beam ID, beam direction, or beam symbols, among other examples. The UE 120 may transmit uplink communications via one or more UE transmit beams 415.

The base station 110 may receive uplink transmissions via one or more BS receive beams 420. The base station 110 may identify a particular UE transmit beam 415, shown as UE transmit beam 415-A, and a particular BS receive beam 420, shown as BS receive beam 420-A, that provide relatively favorable performance (for example, that have a best channel quality of the different measured combinations of UE transmit beams 415 and BS receive beams 420). In some examples, the base station 110 may transmit an indication of which UE transmit beam 415 is identified by the base station 110 as a preferred UE transmit beam, which the base station 110 may select for transmissions from the UE 120. The UE 120 and the base station 110 may thus attain and maintain a BPL for uplink communications (for example, a combination of the UE transmit beam 415-A and the BS receive beam 420-A), which may be further refined and maintained in accordance with one or more established beam refinement procedures. An uplink beam, such as a UE transmit beam 415 or a BS receive beam 420, may be associated with a spatial relation. A spatial relation may indicate a directionality or a characteristic of the uplink beam, similar to one or more QCL properties, as described above.

Additionally, or alternatively, as shown in FIG. 3, the base station 110 and the UE 120 may communicate using a unified TCI framework, in which case the base station 110 may indicate a TCI state that the UE 120 is to use for beamformed uplink communications. For example, in some aspects, the TCI state that the UE 120 is to use for beamformed uplink communications may be a joint TCI state (which may be referred to herein as a joint downlink and uplink TCI state) that defines a common beam to be used for downlink and uplink communication. In this case, the joint downlink and uplink TCI state may include at least one source reference signal to provide a reference (or UE assumption) for determining QCL properties for a downlink communication and/or a spatial filter for uplink communication. For example, the joint downlink and uplink TCI state may be associated with one or more source reference signals that provide common QCL information for UE-dedicated PDSCH reception and one or more CORESETs in a component carrier, and/or one or more source reference signals that provide a reference to determine one or more common uplink transmission spatial filters for a PUSCH based on a dynamic grant or a configured grant and/or one or more dedicated PUCCH resources in a component carrier. Additionally, or alternatively, the unified TCI framework may support a separate downlink TCI state and a separate uplink TCI state to accommodate separate downlink and uplink beam indications (e.g., where a best uplink beam does not correspond to a best downlink beam, or vice versa). In such cases, each valid uplink TCI state configuration may contain a source reference signal to indicate an uplink transmit beam for a target uplink communication (e.g., a target uplink reference signal or a target uplink channel). For example, the source reference signal may be an SRS, an SSB, and/or a CSI-RS, among other examples, and the target uplink communication may be a PRACH, a PUCCH, a PUSCH, an SRS, and/or a DMRS (e.g., a DMRS for a PUCCH or a PUSCH), among other examples. In this way, supporting joint TCI states and/or separate downlink and uplink TCI states may enable a unified TCI framework for downlink and uplink communications, and/or may enable the base station 110 to indicate various uplink QCL relationships (e.g., Doppler shift, Doppler spread, average delay, and/or delay spread, among other examples) for uplink TCI communication.

As indicated above, FIG. 4 is provided as an example. Other examples may differ from what is described with respect to FIG. 4.

Figure 5:
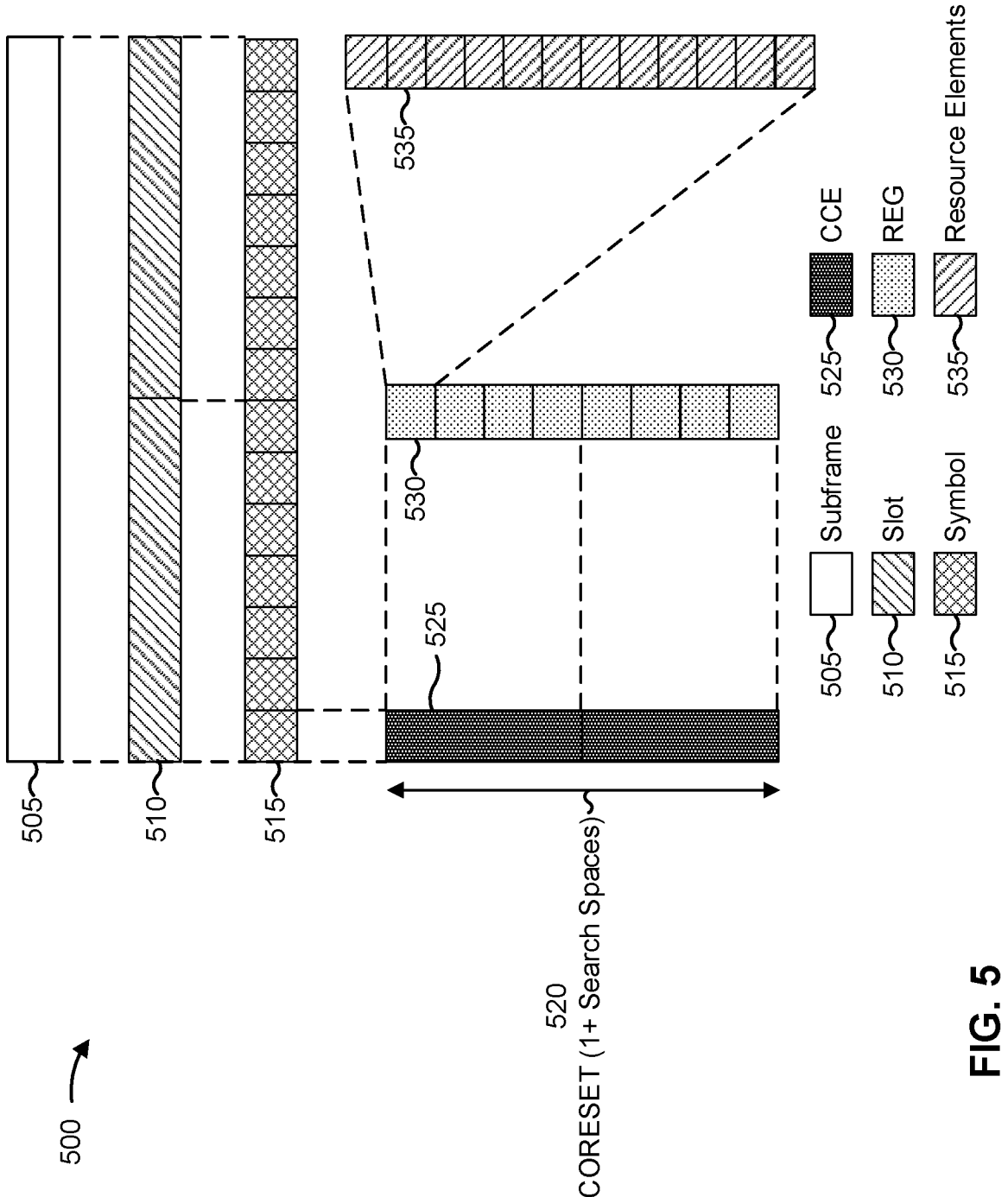
FIG. 5 is a diagram illustrating an example resource structure for wireless communication.

FIG. 5 is a diagram illustrating an example resource structure 500 for wireless communication. Resource structure 500 shows an example of various groups of resources described herein. As shown, resource structure 500 may include a subframe 505. Subframe 505 may include multiple slots 510. While resource structure 500 is shown as including two (2) slots per subframe, a different number of slots may be included in a subframe (e.g., 4 slots, 8 slots, 16 slots, 32 slots, and/or the like). In some aspects, different types of transmission time intervals (TTIs) may be used, other than subframes and/or slots. A slot 510 may include multiple symbols 515, such as fourteen (14) symbols per slot.

The potential control region of a slot 510 may be referred to as a CORESET 520 and may be structured to support an efficient use of resources, such as by flexible configuration or reconfiguration of resources of the CORESET 520 for one or more PDCCHs, one or more PDSCHs, or the like. In some aspects, the CORESET 520 may occupy the first symbol 515 of a slot 510, the first two symbols 515 of a slot 510, or the first three symbols 515 of a slot 510. Thus, a CORESET 520 may include multiple resource blocks (RBs) in the frequency domain, and either one, two, or three symbols 515 in the time domain. In 5G, a quantity of resources included in the CORESET 520 may be flexibly configured, such as by using RRC signaling to indicate a frequency domain region (e.g., a quantity of resource blocks) and/or a time domain region (e.g., a quantity of symbols) for the CORESET 520.

As illustrated, a symbol 515 that includes CORESET 520 may include one or more control channel elements (CCEs) 525, shown as two CCEs 525 as an example, that span a portion of the system bandwidth. A CCE 525 may include DCI that is used to provide control information for wireless communication. A base station may transmit DCI during multiple CCEs 525 (as shown), where the quantity of CCEs 525 used for transmission of DCI represents the aggregation level (AL) used by the BS for the transmission of DCI. In FIG. 5, an aggregation level of two is shown as an example, corresponding to two CCEs 525 in a slot 510. In some aspects, different aggregation levels may be used, such as 1, 2, 4, 8, 16, or the like.

Each CCE 525 may include a fixed quantity of resource element groups (REGs) 530, shown as 6 REGs 530, or may include a variable quantity of REGs 530. In some aspects, the quantity of REGs 530 included in a CCE 525 may be specified by a REG bundle size. A REG 530 may include one resource block, which may include 12 resource elements (REs) 535 within a symbol 515. A resource element 535 may occupy one subcarrier in the frequency domain and one OFDM symbol in the time domain.

A search space may include all possible locations (e.g., in time and/or frequency) where a PDCCH may be located. A CORESET 520 may include one or more search spaces, such as a UE-specific search space, a group-common search space, and/or a common search space. A search space may indicate a set of CCE locations where a UE may find PDCCHs that can potentially be used to transmit control information to the UE. The possible locations for a PDCCH may depend on whether the PDCCH is a UE-specific PDCCH (e.g., for a single UE) or a group-common PDCCH (e.g., for multiple UEs), an aggregation level being used, and/or the like. A possible location (e.g., in time and/or frequency) for a PDCCH may be referred to as a PDCCH candidate, and the set of all possible PDCCH locations at an aggregation level may be referred to as a search space. For example, the set of all possible PDCCH locations for a particular UE may be referred to as a UE-specific search space. Similarly, the set of all possible PDCCH locations across all UEs may be referred to as a common search space. The set of all possible PDCCH locations for a particular group of UEs may be referred to as a group-common search space. One or more search spaces across aggregation levels may be referred to as a search space (SS) set.

A CORESET 520 may be interleaved or non-interleaved. An interleaved CORESET 520 may have a CCE-to-REG mapping such that adjacent CCEs are mapped to scattered REG bundles in the frequency domain (e.g., adjacent CCEs are not mapped to consecutive REG bundles of the CORESET 520). A non-interleaved CORESET 520 may have a CCE-to-REG mapping such that all CCEs are mapped to consecutive REG bundles (e.g., in the frequency domain) of the CORESET 520.

As indicated above, FIG. 5 is provided as an example. Other examples may differ from what is described with respect to FIG. 5.

Figure 6A:
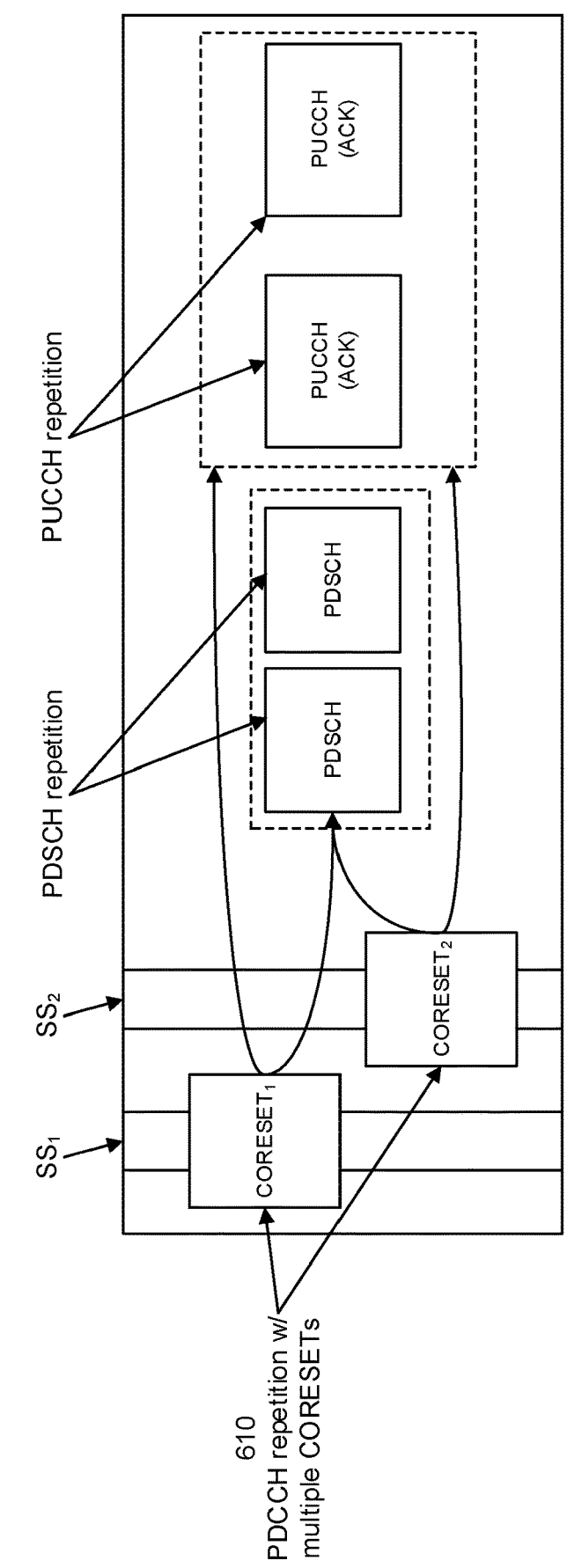
FIGS. 6A-6B are diagrams illustrating examples of downlink and uplink communications configured with multiple repetitions.
Figure 6B:
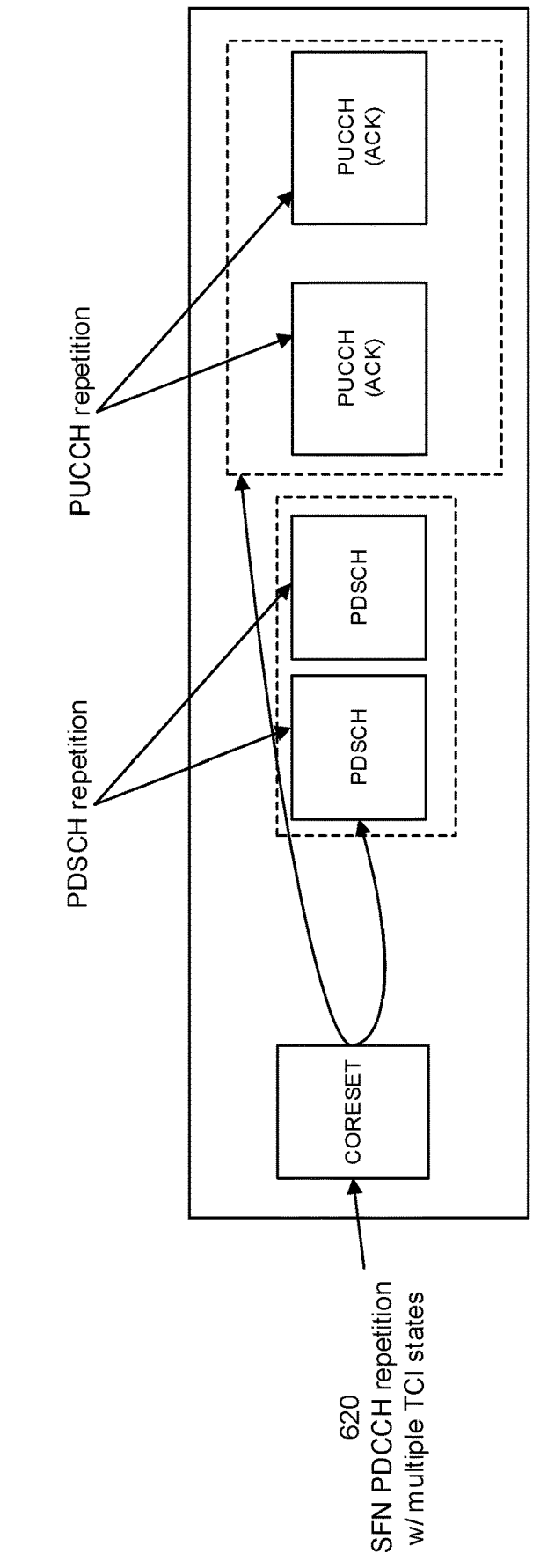

FIGS. 6A-6B are diagrams illustrating examples 600 of downlink and uplink communications configured with multiple repetitions. For example, as shown in FIGS. 6A-6B, one or more communications may be configured to be transmitted in multiple repetitions (e.g., the same transport block is transmitted multiple times) to increase reliability and/or robustness of the one or more communications.

For example, as shown in FIG. 6A, at 610, a base station may transmit, and a UE may receive, multiple repetitions of a PDCCH that carries DCI to schedule a PDSCH and indicate PUCCH resources to be used to transmit hybrid automatic repeat request (HARQ) feedback including an acknowledgement (ACK) or a negative acknowledgment (NACK) for the PDSCH. In the illustrated example, there may be a maximum of two (2) linked PDCCH candidates, whereby the PDCCH may be associated with a repetition configuration in which one DCI message is transmitted in two search spaces associated with two CORESETs. For example, as shown in FIG. 6A, the base station transmits a first CORESET ($CORESET_1$) in a first search space ($SS_1$) and transmits a second CORESET ($CORESET_2$) in a second search space ($SS_2$).

Alternatively, as shown in FIG. 6B, at 620, the base station may transmit the multiple PDCCH repetitions according to a single frequency network (SFN) configuration. For example, when the PDCCH is associated with an SFN repetition configuration, the base station transmits the DCI message in one CORESET using multiple TCI states (e.g., using different downlink beams that are associated with different antenna panels and/or different TRPs, among other examples). Furthermore, in FIGS. 6A-6B, the PDSCH scheduled by the PDCCH and the PUCCH that includes the HARQ feedback for the PDSCH are transmitted with multiple repetitions to increase reliability and/or robustness of the PDSCH and the PUCCH. Furthermore, it will be appreciated that the same or similar PDCCH repetition techniques can be applied in cases where the multiple PDCCH repetitions carry DCI to schedule a PUSCH that may be associated with a single transmission occasion or multiple repetitions to increase reliability and/or robustness of the PUSCH.

Accordingly, as described herein, a base station may transmit multiple repetitions of a PDCCH to improve reliability and/or robustness of the DCI carried in the PDCCH. For example, transmitting one DCI message multiple times using multiple CORESETs associated with different search spaces (e.g., in a non-SFN configuration) and/or multiple TCI states associated with a CORESET (e.g., in an SFN configuration) reduces a likelihood that an interruption to a PDCCH transmission on a particular link causes a communication to be dropped (e.g., due to an object or another obstruction physically blocking a transmission path for the particular link and/or due to other communications causing interference on the particular link). Furthermore, in some cases, the base station may vary one or more transmission parameters when transmitting different repetitions of a PDCCH. For example, in the non-SFN repetition configuration shown in FIG. 6A, the base station may transmit different PDCCH repetitions using different CORESETS associated with different search spaces and/or at different frequencies within the search spaces to avoid potential interference and/or blockages that may affect the different PDCCH repetitions on a particular frequency. Additionally, or alternatively, in the SFN repetition configuration shown in FIG. 6B, the base station may simultaneously transmit different PDCCH repetitions in a CORESET (e.g., using the same time and frequency resources) using different TCI states that are associated with different beam directions to avoid potential interference and/or blockages that may affect the different PDCCH repetitions in a particular beam direction.

As indicated above, FIGS. 6A-6B are provided as examples. Other examples may differ from what is described with respect to FIGS. 6A-6B.

As described above, a path loss reference signal may be transmitted from a base station to a UE in connection with an uplink power control operation associated with an uplink transmission. For example, the UE may measure the path loss reference signal in order to determine a path loss over a channel between the UE and the base station, and the UE may adjust a transmit power used for an uplink transmission to the base station based at least in part on the determined path loss (e.g., increasing the uplink transmit power when there is a high path loss measurement to increase the ability of the base station to receive and detect the uplink transmission and/or decreasing the uplink transmit power when there is a low path loss measurement to reduce potential interference with uplink transmissions by other nearby UEs). In some cases, however, the base station may not provide the UE with configuration information related to the path loss reference signal that the UE is to measure to determine the adjustment to the transmit power that the UE employs for the uplink transmission. In such cases, the UE generally applies one or more rules to determine a default path loss reference signal. For example, the base station may transmit, and the UE may receive, DCI scheduling the uplink transmission, and the UE may determine the default path loss reference signal based on one or more parameters of a CORESET that is associated with a single TCI state.

Accordingly, in some cases, a UE may be unable to determine the default path loss reference signal in cases where a PDCCH is associated with a repetition configuration to improve reliability and/or robustness. For example, when one DCI message is transmitted in two search spaces that are associated with two CORESETs and/or using multiple TCI states (e.g., using two beams that point in different directions), the PDCCH repetition may create ambiguity in cases where the rules that the UE applies to determine the default path loss reference signal are based on a single CORESET and/or a CORESET that has a single TCI state. Additionally, or alternatively, in a wireless network that supports beamformed uplink communication in a unified TCI framework (e.g., using a joint downlink and uplink TCI state and/or separate downlink and uplink TCI states), the UE may be unable to determine the default path loss reference signal based on existing rules that are based only on a downlink TCI state. Furthermore, in cases where the uplink transmission is a PUSCH and/or a PUCCH transmitted with repetitions in a beam sweep, the UE may be unable to determine the default path loss reference signal based on default rules that do not take an uplink beam sweep into consideration (e.g., default rules to determine a single path loss reference signal may be insufficient because different path loss reference signals may be needed to measure the path loss in different directions).

Some aspects described herein relate to techniques and apparatuses to determine a default path loss reference signal for an uplink transmission in cases where a PDCCH scheduling the uplink transmission is associated with a repetition configuration with multiple CORESETs and/or a CORESET associated with multiple TCI states, in cases where the uplink transmission is associated with an uplink TCI state or a joint downlink and uplink TCI state, and/or in cases where the uplink transmission is associated with a repetition configuration including an uplink beam sweep. For example, the UE may apply different rules to determine the default path loss reference signal depending on whether the uplink transmission is a fallback PUSCH associated with PUCCH resources, a fallback PUSCH with PUCCH resources unavailable, a non-fallback PUSCH, a PUCCH, or an SRS. For example, as described herein, the UE may determine the default path loss reference signal based at least in part on a repetition configuration associated with the DCI scheduling the uplink transmission or information associated with a TCI state for an uplink control channel (e.g., a PUCCH) or an uplink reference signal (e.g., an SRS). Furthermore, as described herein, the UE may determine a mapping between different default path loss reference signals and different uplink beams in cases where the uplink transmission is associated with a repetition configuration. Further details are provided below with reference to FIGS. 7A-7B.

Figure 7A:
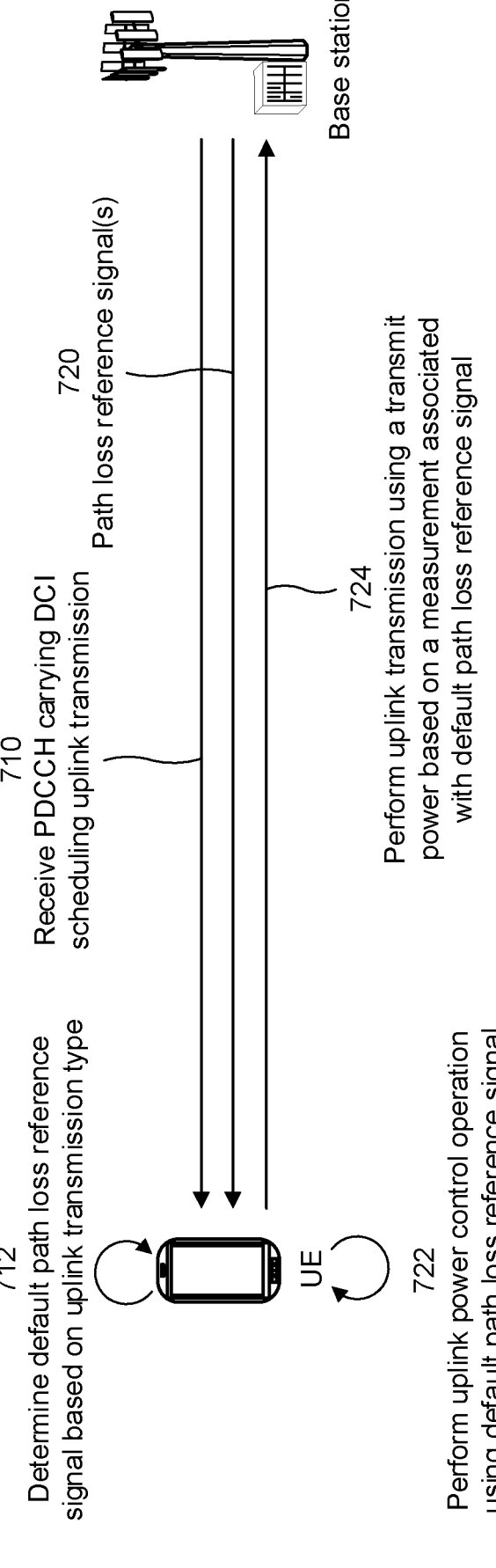
FIGS. 7A-7B are diagrams illustrating one or more examples associated with determining a default path loss reference signal in a unified transmission configuration indication framework.
Figure 7B:
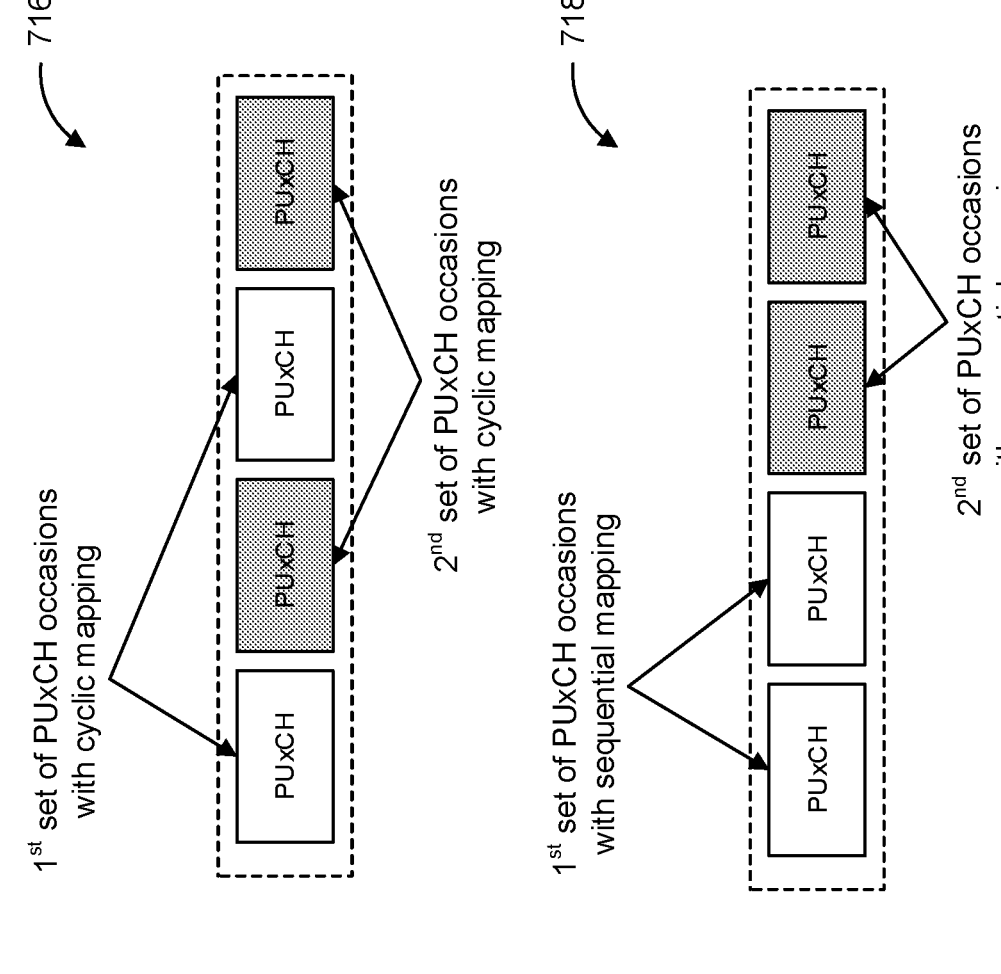

FIGS. 7A-7B are diagrams illustrating one or more examples 700 associated with determining a default path loss reference signal in a unified TCI framework. As shown in FIG. 7A, example(s) 700 include communication between a base station (e.g., base station 110) and a UE (e.g., UE 120) in a wireless network (e.g., wireless network 100). Furthermore, as described herein with reference to FIGS. 7A-7B, the UE may be configured to determine a default path loss reference signal to use in connection with an uplink power control operation for an uplink transmission when one or more conditions are satisfied (e.g., the UE is not configured with a resource indicating a path loss reference signal resource for the uplink transmission). Furthermore, as described herein, the UE may be configured to determine the default path loss reference signal in cases where the uplink transmission is scheduled by a PDCCH carrying DCI in multiple CORESETs and/or one or more CORESETs that are associated with multiple TCI states, in cases where the uplink transmission and/or the CORESET scheduling the uplink transmission are associated with a unified TCI framework (e.g., enabling a joint downlink and uplink TCI state and/or separate downlink and uplink TCI states), and/or in cases where the uplink transmission is transmitted with repetitions in a beam sweep configuration.

For example, as shown in FIG. 7A, at 710, the base station may transmit, and the UE may receive, a PDCCH that carries DCI to schedule an uplink transmission. In some aspects, the PDCCH may be associated with a repetition configuration to increase reliability and/or robustness of the PDCCH. For example, in some aspects, the PDCCH may be transmitted according to a first repetition configuration (e.g., a non-SFN repetition configuration) in which one DCI message is transmitted in multiple CORESETs associated with multiple respective search spaces (e.g., as shown in FIG. 6A). Additionally, or alternatively, the PDCCH may be transmitted according to a second repetition configuration (e.g., an SFN configuration) where one DCI is transmitted in a CORESET associated with multiple TCI states (e.g., using different beams and the same time and frequency resources). Furthermore, in some aspects, the CORESET(s) in which the DCI is transmitted and/or the uplink transmission that is scheduled by the DCI may be associated with a unified TCI framework. For example, the unified TCI framework may support a joint TCI state to indicate a beam to be used for downlink reception and uplink transmission and/or separate downlink and uplink TCI states to separately indicate a beam to be used for downlink reception and a beam to be used for uplink transmission.

As further shown in FIG. 7A, at 712, the UE may determine a default path loss reference signal to use in connection with an uplink power control operation for the uplink transmission according to the repetition configuration of the PDCCH and/or information associated with a TCI state for an uplink control channel (e.g., a PUCCH) and/or an uplink reference signal (e.g., an SRS) based at least in part on determining that one or more conditions are satisfied. Furthermore, as described herein, one or more rules that the UE applies to determine the default path loss reference signal may be based on a type associated with the uplink transmission. For example, different rules to determine the default path loss reference signal may be defined (e.g., in one or more wireless communication standards) for an uplink data channel (e.g., a PUSCH) that is scheduled using DCI having a fallback format (e.g., DCI format 0_0) when PUCCH resources are available, for an uplink data channel that is scheduled using DCI having a fallback format when PUCCH resources are unavailable, for an uplink data channel that may be scheduled with or without repetitions using DCI having a non-fallback format (e.g., DCI format 0_1), for an uplink control channel (e.g., a PUCCH) that may be scheduled with or without repetitions, and/or for an uplink reference signal (e.g., an SRS).

For example, in cases where the uplink transmission is a PUSCH scheduled by DCI having a fallback format and PUCCH resources are available, the base station may provide the UE with a separate uplink TCI state or a joint downlink and uplink TCI state that applies to a set of one or more channels that includes one or more PUCCH resources associated with an active uplink bandwidth part for each carrier and serving cell configured for the UE. In such cases, the PUCCH resources associated with the separate uplink TCI state or the joint downlink and uplink TCI state may each have an associated index, and the UE may use the PUCCH resource with the lowest index as a reference to determine the default path loss reference signal for the PUSCH. For example, the UE may identify a path loss reference signal (PLRS) resource index for a PUCCH transmission in the PUCCH resource with the lowest index, and may use the path loss reference signal associated with the identified PLRS resource index as the default path loss reference for the PUSCH. Furthermore, in cases where the PUCCH resource with the lowest index is associated with multiple TCI states (e.g., two or more separate uplink TCI states or two or more joint TCI states), the UE may determine the default path loss reference signal for the PUSCH using the PLRS resource index in one of the multiple TCI states associated with the PUCCH resource. For example, in some aspects, the UE may determine the default path loss reference signal using the PLRS resource index in a first, a second, or another of the multiple separate uplink or joint TCI states, one of the multiple separate uplink or joint TCI states that has a lowest or highest identifier, and/or one of the multiple separate uplink or joint TCI states that has a lowest or highest pool identifier, among other examples.

Accordingly, if the uplink transmission is a PUSCH transmission scheduled by DCI having a fallback format (e.g., DCI format 0_0), and if the UE is provided a separate uplink TCI state or a joint downlink and uplink TCI state for a set of channels that includes a PUCCH resource with a lowest index for an active uplink bandwidth part of each carrier and serving cell, the UE uses the same PLRS resource index q d as for a PUCCH transmission in the PUCCH resource with the lowest index to determine the default path loss reference signal for the PUSCH transmission. Further, if the PUCCH resource with the lowest index is associated with two separate uplink TCI states or two joint TCI states, the UE uses the same PLRS resource index q d in one of the two separate uplink TCI states or one of the two joint TCI states as for a PUCCH transmission in the PUCCH resource with the lowest index to determine the default path loss reference signal for the PUSCH transmission. For example, the one of the two separate uplink TCI states or the one of the two joint TCI states can be the first uplink TCI state or the first joint TCI state, the second uplink state or the second joint TCI state, the uplink TCI state or joint TCI state with a lower (or higher) identifier, and/or the uplink TCI state or joint TCI state with a lower (or higher) pool identifier.

Alternatively, in cases where the uplink transmission is a PUSCH scheduled by DCI having a fallback format, the UE may apply different rules to determine the default path loss reference signal if PUCCH resources are unavailable (e.g., the UE has not been provided or otherwise configured with PUCCH resources for an active uplink bandwidth part of a current serving cell and/or has not been provided or otherwise configured with a beam indication, such as a spatial setting, a separate uplink TCI state, or a joint TCI state, for PUCCH resources on the active uplink bandwidth part of a primary cell). In such cases, the base station may provide the UE with a higher-layer parameter enabling the UE to determine a default path loss reference signal beam for the fallback PUSCH. For example, in some aspects, the higher-layer parameter may be an RRC parameter such as enableDefaultBeamPL-ForPUSCH0, which may be set to enabled to indicate that the UE may determine a default beam corresponding to the default path loss reference signal for the fallback PUSCH. In such cases, where PUCCH resources are unavailable, the UE may determine the default path loss reference signal using a PLRS resource index that provides a periodic reference signal resource with a shared spatial receive parameter (e.g., QCL-Type D) in a separate downlink TCI state, joint TCI state, or QCL assumption associated with a CORESET in the active downlink bandwidth part of the serving cell.

For example, in cases where the DCI scheduling the PUSCH is transmitted with a repetition configuration including multiple CORESETs that are transmitted in separate search spaces, the UE may determine the default path loss reference signal for the PUSCH using the PLRS resource index associated with one of the CORESETs that has a lowest index associated with a single separate downlink TCI state or a joint TCI state. Additionally, or alternatively, the default path loss reference signal for the PUSCH may be determined using the PLRS resource index associated with one of the CORESETs with a lowest index, and the UE may apply one or more rules to select a single downlink or joint TCI state in cases where the CORESET with the lowest index is associated with multiple downlink TCI states or multiple joint TCI states. For example, in some aspects, the UE may determine the default path loss reference signal using the PLRS resource index in a first downlink or joint TCI state and/or a second downlink or joint TCI state, a downlink or joint TCI state with a lowest or highest identifier, or a downlink or joint TCI state with a lowest or highest pool identifier, among other examples.

Accordingly, if the uplink transmission is a PUSCH transmission scheduled by DCI having a fallback format (e.g., DCI format 0_0) on a serving cell c, the UE is not provided PUCCH resources for the active uplink bandwidth part of the serving cell c, or the UE is not provided a spatial setting or a separate uplink TCI state or a joint downlink and uplink TCI state for PUCCH resources on the active uplink bandwidth part of the primary cell, and the UE is provided the parameter to enable a default beam or path loss reference signal for PUSCH transmission such as enableDefault-BeamPL-ForPUSCH0-, the UE determines the default path loss reference signal using a PLRS resource index q d that provides a periodic reference signal resource with 'QCL-TypeD' in the separate downlink TCI state or the joint downlink and uplink TCI state, or the QCL assumption of a CORESET in the active downlink bandwidth part of the serving cell c. For example, the CORESET associated with the PLRS resource index used to determine the default path loss reference signal may be the CORESET with the lowest index that is associated with a single separate downlink TCI state or a single joint TCI state. Alternatively, the CORESET used to determine the default path loss reference signal may be the CORESET with the lowest index, and in cases where the CORESET is associated with two downlink TCI states or two joint TCI states, the UE may select one of the two downlink or joint TCI states (e.g., the first or the second downlink or joint TCI state, the downlink or joint TCI state with a lower or higher identifier, and/or the downlink or joint TCI state with a lower or higher pool identifier).

In another example, in cases where the uplink transmission is a non-fallback PUSCH (e.g., is scheduled by DCI having a non-fallback format, such as DCI format 0_1), the UE may determine the default path loss reference signal for the non-fallback PUSCH based on a PLRS resource index associated with an uplink reference signal that is associated with a separate uplink TCI state or a joint downlink and uplink TCI state. For example, in cases where the UE is enabled to determine a default beam for a path loss reference signal (e.g., the parameter enableDefaultBeamPL-ForSRS-r16 is set to enabled) and the UE is not provided with a parameter indicating a path loss reference signal resource for the non-fallback PUSCH (e.g., PUSCH-PathlossReferenceRS and/or PUSCH-PathlossReferenceRS-r16), the UE may determine the default path loss reference signal for the non-fallback PUSCH using the same PLRS resource index as an SRS resource set that includes one or more SRS resources associated with the non-fallback PUSCH. Furthermore, in cases where the non-fallback PUSCH is scheduled to be transmitted with repetitions in an uplink beam sweep, the UE may determine a default path loss reference signal associated with each repetition.

For example, as shown in FIG. 7B, at 714-1, the UE may be configured with multiple SRS resource sets that indicate default path loss reference signals for a non-fallback PUSCH that is scheduled with repetitions. For example, the UE may be configured with two SRS resource sets for the usage of non-codebook based uplink MIMO transmissions, and the UE may be configured with two SRS resource sets for the usage of codebook based uplink MIMO transmissions. In this case, the multiple repetitions may be divided into different sets of PUSCH repetitions, and the UE may determine the default path loss reference signal for each set of PUSCH repetitions based on the configured SRS resource sets. For example, as shown at 716, the PUSCH repetitions may be associated with a cyclic mapping in which the default path loss reference signal for a first PUSCH occasion is based on a PLRS resource index associated with a first SRS resource set (e.g., PLRS₁ associated with SRS resource seta), the default path loss reference signal for a second PUSCH occasion is based on a PLRS resource index associated with a second SRS resource set (e.g., PLRS₂ associated with SRS resource seta), and the pattern repeats in a cyclic manner. Alternatively, as shown at 718, the PUSCH repetitions may be associated with a sequential mapping in which the default path loss reference signal for a first set of PUSCH occasions that are earliest in time are based on the PLRS resource index associated with the first SRS resource set, the default path loss reference signal for a second set of PUSCH occasions that are subsequent in time are based on the PLRS resource index associated with the second SRS resource set, and so on, if there are more than two sets of PUSCH occasions and/or SRS resource sets.

Accordingly, if the uplink transmission is a PUSCH transmission that is not scheduled by DCI having a fallback format (e.g., the PUSCH transmission is not scheduled by DCI format 0_0), and if the UE is provided the parameter to enable a default beam or path loss reference signal for SRS transmission such as enableDefaultBeamPL-ForSRS-r16 and is not provided a path loss reference signal for PUSCH transmission such as a PUSCH-PathlossReferenceRS and/or PUSCH-PathlossReferenceRS-r16 parameter, the UE uses the same PLRS resource index q d as for an SRS resource set with an SRS resource associated with the PUSCH transmission to determine the default pathloss reference signal for the PUSCH transmission if the SRS resource set is provided with a separate uplink TCI state or a joint TCI state. Furthermore, if the PUSCH transmission is scheduled with repetitions and is not scheduled by DCI format 0_0 or another DCI having a fallback format, and if the UE is provided a parameter to enable a default beam or path loss reference signal for SRS transmission such as enableDefaultBeamPL-ForSRS-r16 and is not provided a path loss reference signal to PUSCH transmission such as a PUSCH-PathlossReferenceRS and/or PUSCH-PathlossReferenceRS-r16 parameter, the UE may determine, for a set of PUSCH transmission repetitions, to use the same PLRS resource index q d as for an SRS resource set with an SRS resource associated with the set of PUSCH transmission repetitions, if the SRS resource set is provided with a separate uplink TCI state or a joint downlink and uplink TCI state.

In another example, the uplink transmission may be a PUCCH (e.g., carrying HARQ feedback for a PDSCH and/or other UCI). In such cases, the UE may determine the default path loss reference signal for the PUCCH based on a PLRS resource index associated with a CORESET in which the DCI is transmitted to schedule the PUCCH or otherwise allocate resources to the PUCCH. For example, the UE may determine the default path loss reference signal for the PUCCH in cases where the UE is enabled to determine a default beam for a path loss reference signal (e.g., the parameter enableDefaultBeamPL-ForPUCCH-r16 is set to enabled) and the UE is not provided with a parameter indicating a path loss reference signal resource for the PUCCH (e.g., PathlossReferenceRSs). Additionally, or alternatively, the UE may determine the default path loss reference signal for the PUCCH in cases where the UE is not configured with a beam indication for the PUCCH (e.g., the UE is not provided a parameter that indicates a spatial relation for the PUCCH, such as PUCCH-SpatialRelation-Info, or the PUCCH is not included in a set of channels associated with a separate uplink TCI state or any joint downlink and uplink TCI state). In such cases, the UE may determine the default path loss reference signal for the PUCCH using a PLRS resource index that provides a periodic reference signal resource with a shared spatial receive parameter (e.g., QCL-Type D) in a separate downlink TCI state, joint TCI state, or QCL assumption associated with a CORESET in the active downlink bandwidth part of the serving cell.

For example, in cases where the DCI scheduling the PUCCH is transmitted with a repetition configuration including multiple CORESETs that are transmitted in separate search spaces, the UE may determine the default path loss reference signal for the PUCCH using the PLRS resource index associated with one of the CORESETs that has a lowest index associated with a single TCI state (e.g., a separate downlink TCI state or a joint TCI state). Additionally, or alternatively, the default path loss reference signal for the PUCCH may be determined using the PLRS resource index associated with one of the CORESETs with a lowest index, and the UE may apply one or more rules to select a single downlink or joint TCI state in cases where the CORESET with the lowest index is associated with multiple downlink TCI states or multiple joint TCI states. For example, in some aspects, the UE may determine the default path loss reference signal using the PLRS resource index in a first downlink or joint TCI state and/or a second downlink or joint TCI state, a downlink or joint TCI state with a lowest or highest identifier, or a downlink or joint TCI state with a lowest or highest pool identifier, among other examples.

Furthermore, in cases where the non-fallback PUCCH is scheduled to be transmitted with repetitions in an uplink beam sweep, the UE may determine a default path loss reference signal associated with each PUCCH repetition. For example, as shown in FIG. 7B, at 714-2, the UE may receive a CORESET associated with multiple TCI states (e.g., TCI₁ and TCI₂) that are mapped to TCI states for determining the default path loss reference signal for different sets of PUCCH repetitions. In this case, the multiple PUCCH repetitions may be divided into different sets of PUCCH repetitions, and the UE may determine the default path loss reference signal for each set of PUCCH repetitions based on the mapping to the different TCI states associated with the CORESET. For example, the different sets of PUCCH repetitions may be associated with a cyclic mapping, as shown at 716, or with a sequential mapping, as shown at 718.

Accordingly, if the uplink transmission is a PUCCH and if the UE is not provided a pathlossReferenceRSs parameter, and is not provided a PUCCH-SpatialRelationInfo parameter for the PUCCH or the PUCCH is not included in a set of channels associated with any separate uplink TCI state and any joint TCI state, and if the UE is provided a parameter to enable a default beam or path loss reference signal such as enableDefaultBeamPL-ForPUCCH-r16, the UE determines a PLRS resource index q d providing a periodic reference signal resource with 'QCL-TypeD' in a separate downlink TCI state or a joint downlink and uplink TCI state or the QCL assumption of a CORESET in the active downlink bandwidth part of the serving cell c. Furthermore, the CORESET associated with the PLRS resource index q d may be a CORESET with a lowest index associated with a single TCI state or a CORESET with a lowest index. In the latter case, if the CORESET with the lowest index is associated with two downlink TCI states or two joint TCI states, the UE selects one of the TCI states, such as the first or second TCI state, the TCI state with the lower (or higher) identifier, and/or the TCI state with the lower (or higher) pool identifier. Furthermore, in cases where the PUCCH is enabled with multi-beam repetition and the CORESET has multiple associated TCI states, the sets of PUCCH repetitions and TCI state for the PLRS are associated with a one-to-one mapping.

In another example, the uplink transmission may be an SRS that carries information used for uplink channel estimation, which may be used for scheduling, link adaptation, precoder selection, or beam management, among other examples. In such cases, the UE may determine the default path loss reference signal for the SRS in a similar manner as described above for a PUCCH. For example, the default path loss reference signal may be determined based on a PLRS resource index associated with a CORESET in which the DCI is transmitted to schedule or otherwise allocate SRS resources. For example, the UE may determine the default path loss reference signal for the SRS in cases where the UE is enabled to determine a default beam for a path loss reference signal (e.g., the parameter enableDefaultBeamPL-ForSRS-r16 is set to enabled), the UE is not provided with a parameter indicating a path loss reference signal resource for the SRS (e.g., PathlossReferenceRSs), and/or the UE is not configured with a beam indication for the SRS (e.g., the UE is not provided a parameter that indicates a spatial relation for the SRS, such as SRS-SpatialRelationInfo, or the SRS is not included in or associated with a set of channels associated with a separate uplink TCI state or any joint downlink and uplink TCI state). In such cases, the UE may determine the default path loss reference signal for the SRS using a PLRS resource index that provides a periodic reference signal resource with a shared spatial receive parameter (e.g., QCL-Type D) in a separate downlink TCI state, joint TCI state, or QCL assumption associated with a CORESET in the active downlink bandwidth part of the serving cell.

For example, in cases where the DCI scheduling the SRS is transmitted with a repetition configuration including multiple CORESETs that are transmitted in separate search spaces and/or one or more CORESETs that are transmitted using multiple TCI states, the UE may determine the default path loss reference signal for the SRS using the PLRS resource index associated with one of the CORESETs that has a lowest index associated with a single TCI state (e.g., a separate downlink TCI state or a joint TCI state). Additionally, or alternatively, the default path loss reference signal for the SRS may be determined using the PLRS resource index associated with one of the CORESETs with a lowest index, and the UE may apply one or more rules to select a single downlink or joint TCI state in cases where the CORESET with the lowest index is associated with multiple downlink TCI states or multiple joint TCI states. For example, in some aspects, the UE may determine the default path loss reference signal using the PLRS resource index in a first downlink or joint TCI state and/or a second downlink or joint TCI state, a downlink or joint TCI state with a lowest or highest identifier, or a downlink or joint TCI state with a lowest or highest pool identifier, among other examples.

Accordingly, if the uplink transmission is an SRS and if the UE is not provided a pathlossReferenceRSs parameter, and is not provided an SRS-SpatialRelationInfo parameter for the SRS or the SRS is not included in a set of channels associated with any separate uplink TCI state and any joint TCI state, and if the UE is provided a parameter to enable default beam or path loss reference signal such as enableDefaultBeamPL-ForSRS-r16, the UE determines a PLRS resource index q d providing a periodic reference signal resource with QCL-TypeD' in a separate downlink TCI state or a joint downlink and uplink TCI state or the QCL assumption of a CORESET in the active downlink bandwidth part of the serving cell c. Furthermore, the CORESET associated with the PLRS resource index q d may be a CORESET with a lowest index associated with a single TCI state or a CORESET with a lowest index. In the latter case, if the CORESET with the lowest index is associated with two downlink TCI states or two joint TCI states, the UE selects one of the TCI states, such as the first or second TCI state, the TCI state with the lower (or higher) identifier, and/or the TCI state with the lower (or higher) pool identifier.

As further shown in FIG. 7A, the UE may then use the default path loss reference signal in connection with an uplink power control operation for the uplink transmission. For example, as shown at 720, the base station may transmit one or more path loss reference signals using a set of time, frequency, and/or spatial resources associated with the default path loss reference signal for the uplink transmission. In some aspects, the base station may transmit the path loss reference signals at a certain power level that is configured at the UE (e.g., based on information defined in a wireless communication standard and/or information signaled to the UE). Accordingly, the UE may receive the path loss reference signal(s) on the set of time, frequency, and/or spatial resources that are associated with the default path loss reference signal for the uplink transmission, and the UE may measure a power level at which the path loss reference signal(s) are received. As further shown in FIG. 7A, at 722, the UE may perform the uplink power control operation using the measurement associated with the default path loss reference signal. For example, the UE may compare the power level at which the base station transmitted the path loss reference signal(s) and the received power level associated with the path loss reference signal(s), and the difference in power levels may indicate the path loss over a channel between the base station and the UE (e.g., a channel that corresponds to a particular beam direction). As further shown in FIG. 7A, at 724, the UE may determine an uplink transmit power based on the path loss measurement, and may perform the uplink transmission using the uplink transmit power based on the path loss measurement.

As indicated above, FIGS. 7A-7B are provided as examples. Other examples may differ from what is described with respect to FIGS. 7A-7B.

FIG. 8 is a flowchart of an example method 800 of wireless communication. The method 800 may be performed by, for example, a UE (e.g., UE 120).

At 810, the UE may receive, from a base station, DCI scheduling an uplink transmission. For example, the UE (e.g., using reception component 902, depicted in FIG. 9) may receive, from a base station, DCI scheduling an uplink transmission, as described above in connection with, for example, FIG. 7A at 710. In some aspects, the uplink transmission is an uplink data channel scheduled by the DCI using a fallback format, an uplink data channel scheduled by the DCI using a non-fallback format, an uplink control channel, or a sounding reference signal.

At 820, the UE may determine a default path loss reference signal associated with the uplink transmission based at least in part on a repetition configuration associated with the DCI or information associated with a TCI state for an uplink control channel or an uplink reference signal. For example, the UE (e.g., using determination component 908, depicted in FIG. 9) may determine a default path loss reference signal associated with the uplink transmission based at least in part on a repetition configuration associated with the DCI or information associated with a TCI state for an uplink control channel or an uplink reference signal, as described above in connection with, for example, FIG. 7A at 712.

In some aspects, where the uplink transmission is an uplink data channel scheduled by the DCI using a fallback format, the default path loss reference signal is based at least in part on a path loss reference signal resource index associated with an uplink control channel configured with an uplink TCI state or a joint downlink and uplink TCI state. In some aspects, the uplink control channel is associated with multiple uplink TCI states or multiple joint downlink and uplink TCI states, and the path loss reference signal resource index is associated with one of the multiple uplink TCI states or one of the multiple joint downlink and uplink TCI states.

Additionally, or alternatively, in cases where the uplink transmission is an uplink data channel scheduled by the DCI using a fallback format, the default path loss reference signal is based at least in part on a path loss reference signal resource index associated with a downlink TCI state or a joint downlink and uplink TCI state for a control resource set associated with the DCI. In some aspects, the DCI is associated with multiple CORESETs, and the path loss reference signal resource index is associated with one of the multiple CORESETs that is associated with a single downlink TCI state or a single joint downlink and uplink TCI state. In some aspects, the DCI is associated with a CORESET associated with multiple downlink TCI states or multiple joint downlink and uplink TCI states, and the path loss reference signal resource index is associated with one of the multiple downlink TCI states or multiple joint downlink and uplink TCI states.

In some aspects, the uplink transmission is an uplink data channel scheduled by the DCI using a non-fallback format, and the default path loss reference signal is based at least in part on a path loss reference signal resource index associated with an SRS configured with an uplink TCI state or a joint downlink and uplink TCI state. In some aspects, the uplink data channel is associated with multiple repetitions using different beams, and the default path loss reference signal is determined for each of the different beams based at least in part on a path loss reference signal resource index associated with an SRS resource set configured with an uplink TCI state or a joint downlink and uplink TCI state.

In some aspects, the uplink transmission is an uplink control channel, and the default path loss reference signal is based at least in part on a path loss reference signal resource index associated with a downlink TCI state or a joint downlink and uplink TCI state for a CORESET associated with the DCI. In some aspects, the DCI is associated with multiple CORESETs, and the path loss reference signal resource index is associated with one of the multiple CORESETs that is associated with a single downlink TCI state or a single joint downlink and uplink TCI state. In some aspects, the DCI is associated with a CORESET associated with multiple downlink TCI states or multiple joint downlink and uplink TCI states, and the path loss reference signal resource index is associated with one of the multiple downlink TCI states or multiple joint downlink and uplink TCI states. In some aspects, the uplink control channel is associated with multiple repetitions using different beams that are mapped to the multiple downlink TCI states or the multiple joint downlink and uplink TCI states.

In some aspects, the uplink transmission is an SRS, and the default path loss reference signal is based at least in part on a path loss reference signal resource index associated with a downlink TCI state or a joint downlink and uplink TCI state for a CORESET associated with the DCI. In some aspects, the path loss reference signal resource index is associated with one of multiple CORESETs associated with a single downlink TCI state or a single joint downlink and uplink TCI state, or one of multiple downlink TCI states or multiple joint downlink and uplink TCI states associated with a CORESET.

At 830, the UE may perform an uplink power control operation for the uplink transmission using the default path loss reference signal. For example, the UE (e.g., using uplink power control component 910, depicted in FIG. 9) may perform an uplink power control operation for the uplink transmission using the default path loss reference signal, as described above in connection with, for example, FIG. 7A at 724.

Although FIG. 8 shows example blocks of method 800, in some aspects, method 800 may include additional blocks, fewer blocks, different blocks, or differently arranged blocks than those depicted in FIG. 8. Additionally, or alternatively, two or more of the blocks of method 800 may be performed in parallel.

Figure 9:
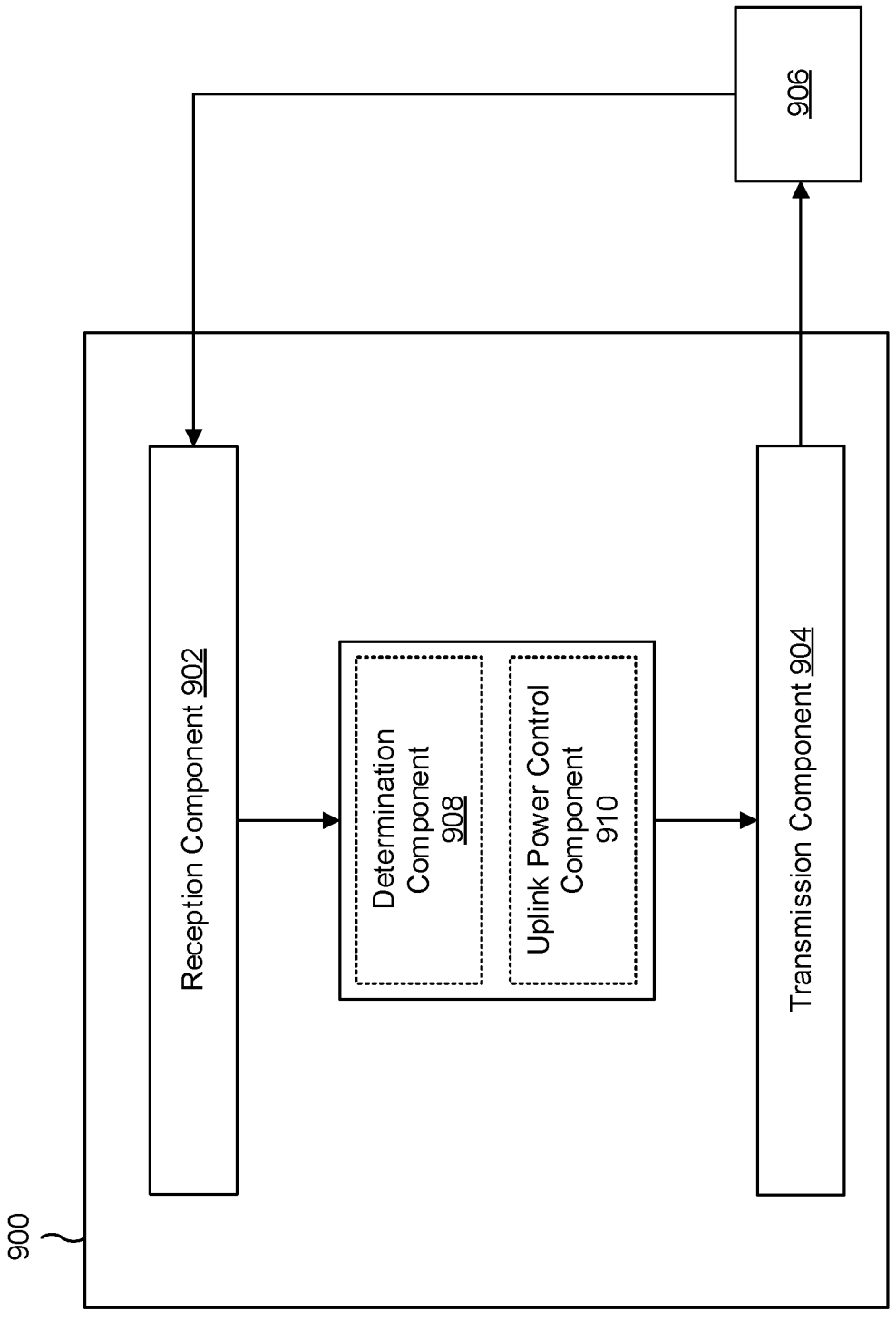
FIG. 9 is a block diagram of an example apparatus for wireless communication.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of a determination component 908 or an uplink power control component 910, among other examples.

In some aspects, the apparatus 900 may be configured to perform one or more operations described herein in connection with FIGS. 7A-7B. Additionally, or alternatively, the apparatus 900 may be configured to perform one or more processes described herein, such as process 800 of FIG. 8. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The reception component 902 may receive, from a base station, DCI scheduling an uplink transmission. The determination component 908 may determine a default path loss reference signal associated with the uplink transmission based at least in part on a repetition configuration associated with the DCI or information associated with a TCI state for an uplink control channel or an uplink reference signal. The uplink power control component 910 may perform an uplink power control operation for the uplink transmission using the default path loss reference signal.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
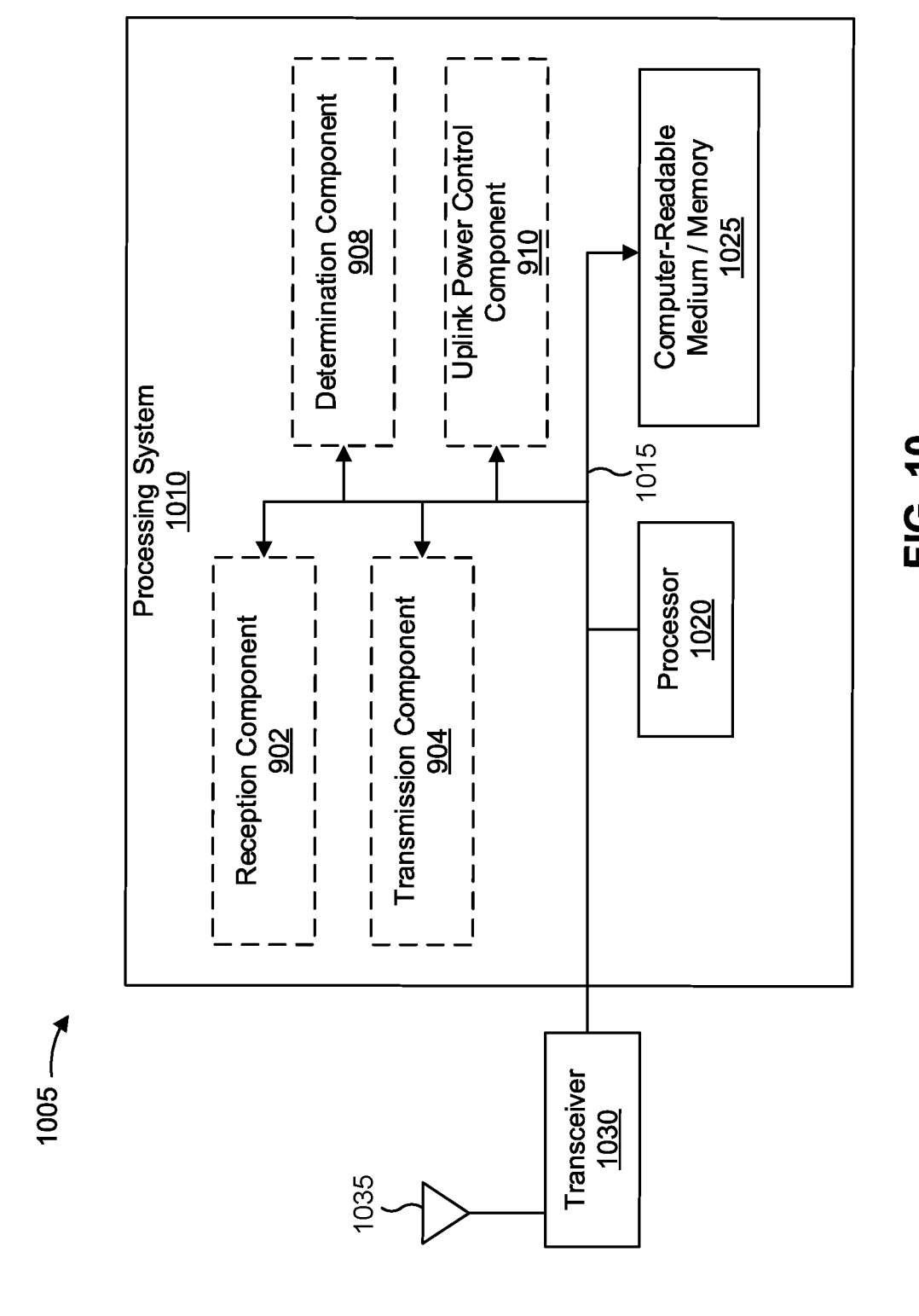
FIG. 10 is a diagram illustrating an example of a hardware implementation for an apparatus employing a processing system.

FIG. 10 is a diagram illustrating an example 1000 of a hardware implementation for an apparatus 1005 employing a processing system 1010. The apparatus 1005 may be a UE.

The processing system 1010 may be implemented with a bus architecture, represented generally by the bus 1015. The bus 1015 may include any number of interconnecting buses and bridges depending on the specific application of the processing system 1010 and the overall design constraints. The bus 1015 links together various circuits including one or more processors and/or hardware components, represented by the processor 1020, the illustrated components, and the computer-readable medium/memory 1025. The bus 1015 may also link various other circuits, such as timing sources, peripherals, voltage regulators, power management circuits, and/or the like.

The processing system 1010 may be coupled to a transceiver 1030. The transceiver 1030 is coupled to one or more antennas 1035. The transceiver 1030 provides a means for communicating with various other apparatuses over a transmission medium. The transceiver 1030 receives a signal from the one or more antennas 1035, extracts information from the received signal, and provides the extracted information to the processing system 1010, specifically the reception component 902. In addition, the transceiver 1030 receives information from the processing system 1010, specifically the transmission component 904, and generates a signal to be applied to the one or more antennas 1035 based at least in part on the received information.

The processing system 1010 includes a processor 1020 coupled to a computer-readable medium/memory 1025. The processor 1020 is responsible for general processing, including the execution of software stored on the computer-readable medium/memory 1025. The software, when executed by the processor 1020, causes the processing system 1010 to perform the various functions described herein for any particular apparatus. The computer-readable medium/memory 1025 may also be used for storing data that is manipulated by the processor 1020 when executing software. The processing system further includes at least one of the illustrated components. The components may be software modules running in the processor 1020, resident/stored in the computer readable medium/memory 1025, one or more hardware modules coupled to the processor 1020, or some combination thereof.

In some aspects, the processing system 1010 may be a component of the UE 120 and may include the memory 282 and/or at least one of the TX MIMO processor 266, the RX processor 258, and/or the controller/processor 280. In some aspects, the apparatus 1005 for wireless communication includes means for receiving, from a base station, DCI scheduling an uplink transmission, means for determining a default path loss reference signal associated with the uplink transmission based at least in part on a repetition configuration associated with the DCI or information associated with a TCI state for an uplink control channel or an uplink reference signal, and/or means for performing an uplink power control operation for the uplink transmission using the default path loss reference signal. The aforementioned means may be one or more of the aforementioned components of the apparatus 900 and/or the processing system 1010 of the apparatus 1005 configured to perform the functions recited by the aforementioned means. As described elsewhere herein, the processing system 1010 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 10 is provided as an example. Other examples may differ from what is described in connection with FIG. 10.

The following provides an overview of some aspects of the present disclosure:

Aspect 1: A method of wireless communication performed by a UE, comprising: receiving, from a base station, DCI scheduling an uplink transmission; determining a default path loss reference signal associated with the uplink transmission based at least in part on a repetition configuration associated with the DCI or information associated with a TCI state for an uplink control channel or an uplink reference signal; and performing an uplink power control operation for the uplink transmission using the default path loss reference signal.

Aspect 2: The method of aspect 1, wherein the uplink transmission is an uplink data channel scheduled by the DCI using a fallback format, and wherein the default path loss reference signal is based at least in part on a path loss reference signal resource index associated with an uplink control channel configured with an uplink TCI state or a joint downlink and uplink TCI state.

Aspect 3: The method of any of aspects 1-2, wherein the uplink control channel is associated with multiple uplink TCI states or multiple joint downlink and uplink TCI states, and wherein the path loss reference signal resource index is associated with one of the multiple uplink TCI states or one of the multiple joint downlink and uplink TCI states.

Aspect 4: The method of aspect 1, wherein the uplink transmission is an uplink data channel scheduled by the DCI using a fallback format, and wherein the default path loss reference signal is based at least in part on a path loss reference signal resource index associated with a downlink TCI state or a joint downlink and uplink TCI state for a CORESET associated with the DCI.

Aspect 5: The method of aspect 4, wherein the DCI is associated with multiple CORESETs, and wherein the path loss reference signal resource index is associated with one of the multiple CORESETs that is associated with a single downlink TCI state or a single joint downlink and uplink TCI state.

Aspect 6: The method of any of aspects 4-5, wherein the DCI is associated with a CORESET associated with multiple downlink TCI states or multiple joint downlink and uplink TCI states, and wherein the path loss reference signal resource index is associated with one of the multiple downlink TCI states or multiple joint downlink and uplink TCI states.

Aspect 7: The method of aspect 1, wherein the uplink transmission is an uplink data channel scheduled by the DCI using a non-fallback format, and wherein the default path loss reference signal is based at least in part on a path loss reference signal resource index associated with a sounding reference signal configured with an uplink TCI state or a joint downlink and uplink TCI state.

Aspect 8: The method of aspect 7, wherein the uplink data channel is associated with multiple repetitions using different beams, and wherein the default path loss reference signal is determined for each of the different beams based at least in part on a path loss reference signal resource index associated with an SRS resource set configured with an uplink TCI state or a joint downlink and uplink TCI state.

Aspect 9: The method of aspect 1, wherein the uplink transmission is an uplink control channel, and wherein the default path loss reference signal is based at least in part on a path loss reference signal resource index associated with a downlink TCI state or a joint downlink and uplink TCI state for a CORESET associated with the DCI.

Aspect 10: The method of aspect 9, wherein the DCI is associated with multiple CORESETs, and wherein the path loss reference signal resource index is associated with one of the multiple CORESETs that is associated with a single downlink TCI state or a single joint downlink and uplink TCI state.

Aspect 11: The method of any of aspects 9-10, wherein the DCI is associated with a CORESET associated with multiple downlink TCI states or multiple joint downlink and uplink TCI states, and wherein the path loss reference signal resource index is associated with one of the multiple downlink TCI states or multiple joint downlink and uplink TCI states.

Aspect 12: The method of aspect 11, wherein the uplink control channel is associated with multiple repetitions using different beams that are mapped to the multiple downlink TCI states or the multiple joint downlink and uplink TCI states.

Aspect 13: The method of aspect 1, wherein the uplink transmission is an SRS, and wherein the default path loss reference signal is based at least in part on a path loss reference signal resource index associated with a downlink TCI state or a joint downlink and uplink TCI state for a CORESET associated with the DCI.

Aspect 14: The method of aspect 13, wherein the path loss reference signal resource index is associated with one of multiple CORESETs that is associated with a single downlink TCI state or a single joint downlink and uplink TCI state, or one of multiple downlink TCI states or multiple joint downlink and uplink TCI states associated with a CORESET.

Aspect 15: An apparatus for wireless communication at a device, comprising a processor; memory coupled with the processor; and instructions stored in the memory and executable by the processor to cause the apparatus to perform the method of any of aspects 1-14.

Aspect 16: A device for wireless communication, comprising a memory and one or more processors coupled to the memory, the memory and the one or more processors configured to perform the method of any of aspects 1-14.

Aspect 17: An apparatus for wireless communication, comprising at least one means for performing the method of any of aspects 1-14.

Aspect 18: A non-transitory computer-readable medium storing code for wireless communication, the code comprising instructions executable by a processor to perform the method of any of aspects 1-14.

Aspect 19: A non-transitory computer-readable medium storing a set of instructions for wireless communication, the set of instructions comprising one or more instructions that, when executed by one or more processors of a device, cause the device to perform the method of any of aspects 1-14.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
receiving, from a base station, downlink control information (DCI) scheduling an uplink transmission;
determining a default path loss reference signal associated with the uplink transmission based at least in part on information associated with a transmission configuration indication (TCI) state for an uplink control channel or an uplink reference signal, wherein the default path loss reference signal is based at least in part on a path loss reference signal resource index associated with a downlink TCI state or a joint downlink and uplink TCI state for a control resource set associated with the DCI; and
performing an uplink power control operation for the uplink transmission using the default path loss reference signal.

2. The method of claim 1,
wherein the uplink transmission is an uplink data channel scheduled by the DCI using a fallback format, and wherein the default path loss reference signal is based at least in part on a path loss reference signal resource index associated with an uplink control channel configured with an uplink TCI state or a joint downlink and uplink TCI state.

3. The method of claim 2,
wherein the uplink control channel is associated with multiple uplink TCI states or multiple joint downlink and uplink TCI states, and wherein the path loss reference signal resource index is associated with one of the multiple uplink TCI states or one of the multiple joint downlink and uplink TCI states.

4. The method of claim 1,
wherein the uplink transmission is an uplink data channel scheduled by the DCI using a fallback format.

5. The method of claim 4,
wherein the DCI is associated with multiple control resource sets (CORESETs), and wherein the path loss reference signal resource index is associated with one of the multiple CORESETs that is associated with a single downlink TCI state or a single joint downlink and uplink TCI state.

6. The method of claim 4,
wherein the DCI is associated with a control resource set associated with multiple downlink TCI states or multiple joint downlink and uplink TCI states, and wherein the path loss reference signal resource index is associated with one of the multiple downlink TCI states or multiple joint downlink and uplink TCI states.

7. The method of claim 1,
wherein the uplink transmission is an uplink data channel scheduled by the DCI using a non-fallback format, and wherein the default path loss reference signal is based at least in part on a path loss reference signal resource index associated with a sounding reference signal configured with an uplink TCI state or a joint downlink and uplink TCI state.

8. The method of claim 7,
wherein the uplink data channel is associated with multiple repetitions using different beams, and wherein the default path loss reference signal is determined for each of the different beams based at least in part on a path loss reference signal resource index associated with a sounding reference signal resource set configured with an uplink TCI state or a joint downlink and uplink TCI state.

9. The method of claim 1,
wherein the uplink transmission is an uplink control channel, and wherein the default path loss reference signal is based at least in part on a path loss reference signal resource index associated with a downlink TCI state or a joint downlink and uplink TCI state for a control resource set associated with the DCI.

10. The method of claim 9,
wherein the DCI is associated with multiple control resource sets (CORESETs), and wherein the path loss reference signal resource index is associated with one of the multiple CORESETs that is associated with a single downlink TCI state or a single joint downlink and uplink TCI state.

11. The method of claim 9,
wherein the DCI is associated with a control resource set associated with multiple downlink TCI states or multiple joint downlink and uplink TCI states, and wherein the path loss reference signal resource index is associated with one of the multiple downlink TCI states or multiple joint downlink and uplink TCI states.

12. The method of claim 11,
wherein the uplink control channel is associated with multiple repetitions using different beams that are mapped to the multiple downlink TCI states or the multiple joint downlink and uplink TCI states.

13. The method of claim 1,
wherein the uplink transmission is a sounding reference signal, and wherein the default path loss reference signal is based at least in part on a path loss reference signal resource index associated with a downlink TCI state or a joint downlink and uplink TCI state for a control resource set associated with the DCI.

14. The method of claim 13,
wherein the path loss reference signal resource index is associated with one of multiple control resource sets (CORESETs) that is associated with a single downlink TCI state or a single joint downlink and uplink TCI state, or one of multiple downlink TCI states or multiple joint downlink and uplink TCI states associated with a CORESET.

15. A user equipment (UE) for wireless communication, comprising:

a memory; and one or more processors operatively coupled to the memory, the memory and the one or more processors configured to:

receive, from a base station, downlink control information (DCI) scheduling an uplink transmission;

determine a default path loss reference signal associated with the uplink transmission based at least in part on a information associated with a transmission configuration indication (TCI) state for an uplink control channel or an uplink reference signal, wherein the default path loss reference signal is based at least in part on a path loss reference signal resource index associated with a downlink TCI state or a joint downlink and uplink TCI state for a control resource set associated with the DCI; and perform an uplink power control operation for the uplink transmission using the default path loss reference signal.

16. The UE of claim 15, wherein the uplink transmission is an uplink data channel scheduled by the DCI using a fallback format, and wherein the default path loss reference signal is based at least in part on a path loss reference signal resource index associated with an uplink control channel configured with an uplink TCI state or a joint downlink and uplink TCI state.

17. The UE of claim 16, wherein the uplink control channel is associated with multiple uplink TCI states or multiple joint downlink and uplink TCI states, and wherein the path loss reference signal resource index is associated with one of the multiple uplink TCI states or one of the multiple joint downlink and uplink TCI states.

18. The UE of claim 15, wherein the uplink transmission is an uplink data channel scheduled by the DCI using a fallback format.

19. The UE of claim 18, wherein the DCI is associated with multiple control resource sets (CORESETs), and wherein the path loss reference signal resource index is associated with one of the multiple CORESETs that is associated with a single downlink TCI state or a single joint downlink and uplink TCI state.

20. The UE of claim 18, wherein the DCI is associated with a control resource set associated with multiple downlink TCI states or multiple joint downlink and uplink TCI states, and wherein the path loss reference signal resource index is associated with one of the multiple downlink TCI states or multiple joint downlink and uplink TCI states.

21. The UE of claim 15, wherein the uplink transmission is an uplink data channel scheduled by the DCI using a non-fallback format, and wherein the default path loss reference signal is based at least in part on a path loss reference signal resource index associated with a sounding reference signal configured with an uplink TCI state or a joint downlink and uplink TCI state.

22. The UE of claim 21, wherein the uplink data channel is associated with multiple repetitions using different beams, and wherein the default path loss reference signal is determined for each of the different beams based at least in part on a path loss reference signal resource index associated with a sounding reference signal resource set configured with an uplink TCI state or a joint downlink and uplink TCI state.

23. The UE of claim 15, wherein the uplink transmission is an uplink control channel, and wherein the default path loss reference signal is based at least in part on a path loss reference signal resource index associated with a downlink TCI state or a joint downlink and uplink TCI state for a control resource set associated with the DCI.

24. The UE of claim 23, wherein the DCI is associated with multiple control resource sets (CORESETs), and wherein the path loss reference signal resource index is associated with one of the multiple CORESETs that is associated with a single downlink TCI state or a single joint downlink and uplink TCI state.

25. The UE of claim 23, wherein the DCI is associated with a control resource set associated with multiple downlink TCI states or multiple joint downlink and uplink TCI states, and wherein the path loss reference signal resource index is associated with one of the multiple downlink TCI states or multiple joint downlink and uplink TCI states.

26. The UE of claim 25, wherein the uplink control channel is associated with multiple repetitions using different beams that are mapped to the multiple downlink TCI states or the multiple joint downlink and uplink TCI states.

27. The UE of claim 15, wherein the uplink transmission is a sounding reference signal, and wherein the default path loss reference signal is based at least in part on a path loss reference signal resource index associated with a downlink TCI state or a joint downlink and uplink TCI state for a control resource set associated with the DCI.

28. The UE of claim 27, wherein the path loss reference signal resource index is associated with one of multiple control resource sets (CORESETs) that is associated with a single downlink TCI state or a single joint downlink and uplink TCI state, or one of multiple downlink TCI states or multiple joint downlink and uplink TCI states associated with a CORESET.

29. A non-transitory computer-readable medium storing a set of instructions for wireless communication, the set of instructions comprising:

one or more instructions that, when executed by one or more processors of a user equipment (UE), cause the UE to:

receive, from a base station, downlink control information (DCI) scheduling an uplink transmission;

determine a default path loss reference signal associated with the uplink transmission based at least in part on information associated with a transmission configuration indication state for an uplink control channel or an uplink reference signal, wherein the default path loss reference signal is based at least in part on a path loss reference signal resource index associated with a downlink TCI state or a joint downlink and uplink TCI state for a control resource set associated with the DCI; and perform an uplink power control operation for the uplink transmission using the default path loss reference signal.

30. An apparatus for wireless communication, comprising:

means for receiving, from a base station, downlink control information (DCI) scheduling an uplink transmission;

means for determining a default path loss reference signal associated with the uplink transmission based at least in part on information associated with a transmission configuration indication state for an uplink control channel or an uplink reference signal, wherein the default path loss reference signal is based at least in part on a path loss reference signal resource index associated with a downlink TCI state or a joint downlink and uplink TCI state for a control resource set associated with the DCI; and means for performing an uplink power control operation for the uplink transmission using the default path loss reference signal.

\* \* \* \* \*